(12) United States Patent
Spence et al.

(10) Patent No.: US 11,710,421 B2
(45) Date of Patent: *Jul. 25, 2023

(54) DRIVING ANALYSIS AND INSTRUCTION DEVICE

(71) Applicant: Garmin Switzerland GmbH, Schaffhausen (CH)

(72) Inventors: Adam J. Spence, Olathe, KS (US); Joseph R. Avey, Kansas City, KS (US); David J. Frank, Olathe, KS (US)

(73) Assignee: Garmin Switzerland GmbH

( * ) Notice: Subject to any disclaimer, the term of this patent is extended or adjusted under 35 U.S.C. 154(b) by 483 days.

This patent is subject to a terminal disclaimer.

(21) Appl. No.: 16/705,032

(22) Filed: Dec. 5, 2019

(65) Prior Publication Data

US 2020/0184849 A1    Jun. 11, 2020

Related U.S. Application Data

(60) Provisional application No. 62/775,614, filed on Dec. 5, 2018.

(51) Int. Cl.
*G09B 19/16* (2006.01)
*B60W 50/14* (2020.01)
(Continued)

(52) U.S. Cl.
CPC ......... *G09B 19/167* (2013.01); *B60W 40/114* (2013.01); *B60W 50/14* (2013.01);
(Continued)

(58) Field of Classification Search
CPC ...... G09B 19/167; G09B 5/02; B60W 40/114; B60W 50/14; B60W 2300/28; G01C 21/3629; G01C 21/3641
See application file for complete search history.

(56) References Cited

U.S. PATENT DOCUMENTS 7,744,451 B2    6/2010  Tipping et al.
2008/0266324 A1* 10/2008  Lynch ................. G06T 1/0007
                                                           342/451
(Continued)

OTHER PUBLICATIONS

Cardamone et al., Searching for the Optimal Racing Line Using Genetic Algorithms, Aug. 18-21, 2010 (Year: 2010).*

(Continued)

*Primary Examiner* — Dale W Hilgendorf
*Assistant Examiner* — Hana Lee
(74) *Attorney, Agent, or Firm* — Samuel M. Korte; Max M. Ali

(57) ABSTRACT

A racing coach device stores a first path of travel along a racetrack over a first time period and a second path of travel along the racetrack over a second time period. The racing coach device identifies, for each of a plurality of geolocations along the racetrack, one of the first path of travel or the second path of travel that is associated with a shorter duration of time over which the user traversed a segment of the path of travel associated with each of the plurality of geolocations. The device determines an optimal path of travel along the racetrack based on the identified first and second path of travel for each segment of the path of travel at each of the plurality of geolocations that results in a calculated lap time to traverse the racetrack that is less than the first time period and the second time period.

24 Claims, 14 Drawing Sheets

(51) Int. Cl.
- B60W 40/114 (2012.01)
- G01C 21/36 (2006.01)
- G09B 5/02 (2006.01)

(52) U.S. Cl.
CPC ..... *G01C 21/3629* (2013.01); *G01C 21/3641* (2013.01); *G09B 5/02* (2013.01); *B60W 2300/28* (2013.01)

(56) References Cited

U.S. PATENT DOCUMENTS

| | | | |
|---|---|---|---|
| 2014/0274304 A1 | 9/2014 | Haswell | |
| 2017/0039870 A1* | 2/2017 | Ellis | G01S 19/19 |
| 2017/0213466 A1* | 7/2017 | Azar | G05D 1/0088 |
| 2018/0162359 A1* | 6/2018 | Perkins | B60W 20/14 |
| 2019/0034735 A1* | 1/2019 | Cuban | G06T 7/20 |
| 2020/0126448 A1* | 4/2020 | Spano | G06F 3/165 |

OTHER PUBLICATIONS

Kapania et al., A Sequential Two-Step Algorithm for Fast Generation of Vehicle Racing Trajectories, Jun. 2, 2016 (Year: 2016).*

Theodosis et al., Nonlinear Optimization of a Racing Line for an Autonomous Racecar Using Professional Driving Techniques, Sep. 17, 2013 (Year: 2013).*

Apex Rally Team, "Here's a video from last Saturday, . . . " [Facebook Video—Posted Aug. 31, 2016], Retrieved from Internet: https://ms-my.facebook.com/ApexRallyTeam/videos/heres-a-video-from-last-saturday-made-up-from-several-runs-spliced-toge (Year: 2016).*

Printout from https://apextrackcoach.com/ published prior to Dec. 5, 2019.

Printout from https://apextrackcoach.com/what-is-lap-timer-plus/ published prior to Dec. 5, 2019.

Printout from https://racerender.com/TrackAddict/Features.html published prior to Dec. 5, 2019.

Printout from https://www.aim-sportline.com/download/faqs/eng/software/rsa/FAQ_RSA_KMLGoogleEarth_100_eng.pdf published prior to Dec. 5, 2019.

Printout from https://www.aim-sportline.com/download/faqs/eng/software/rsa/FAQ_RSA_MaxMinValues_100_eng.pdf published prior to Dec. 5, 2019.

Printout from https://www.aim-sportline.com/en/faqs/software/rs3.htm published prior to Dec. 5, 2019.

Printout from https://www.aim-sportline.com/en/products/solo2-solo2dl/index.htm published prior to Dec. 5, 2019.

Printout from https://www.aimtechnologies.com/aim-smartycam-gp-hd-rev-2-2/ published prior to Dec. 5, 2019.

Printout from https://www.aimtechnologies.com/aim-solo-2-dl/ published prior to Dec. 5, 2019.

Printout from https://www.cosworth.com/electronics/automotive-electronics/pdr-software/ published prior to Dec. 5, 2019.

Printout from https://www.gps-laptimer.de/ published prior to Dec. 5, 2019.

Printout from https://www.hptuners.com/product/trackaddict-app/ published prior to Dec. 5, 2019.

Printout from https://www.motec.com.au/i2/i2highlights/ published prior to Dec. 5, 2019.

Printout from https://www.vboxmotorsport.co.uk/index.php/us/12-products/video-loggers/273-vbox-video-hd2-us published prior to Dec. 5, 2019.

Printout from https://www.vboxmotorsport.co.uk/index.php/us/13-products/performance-meters/80-vbox-laptimer-us published prior to Dec. 5, 2019.

Printout from https://www.vboxmotorsport.co.uk/index.php/us/products-us/32-products/software/179-circuit-tools-us published prior to Dec. 5, 2019.

Printout from https://www.vboxmotorsport.co.uk/index.php/us/products-us/32-products/software/265-vbox-test-suite-us published prior to Dec. 5, 2019.

\* cited by examiner

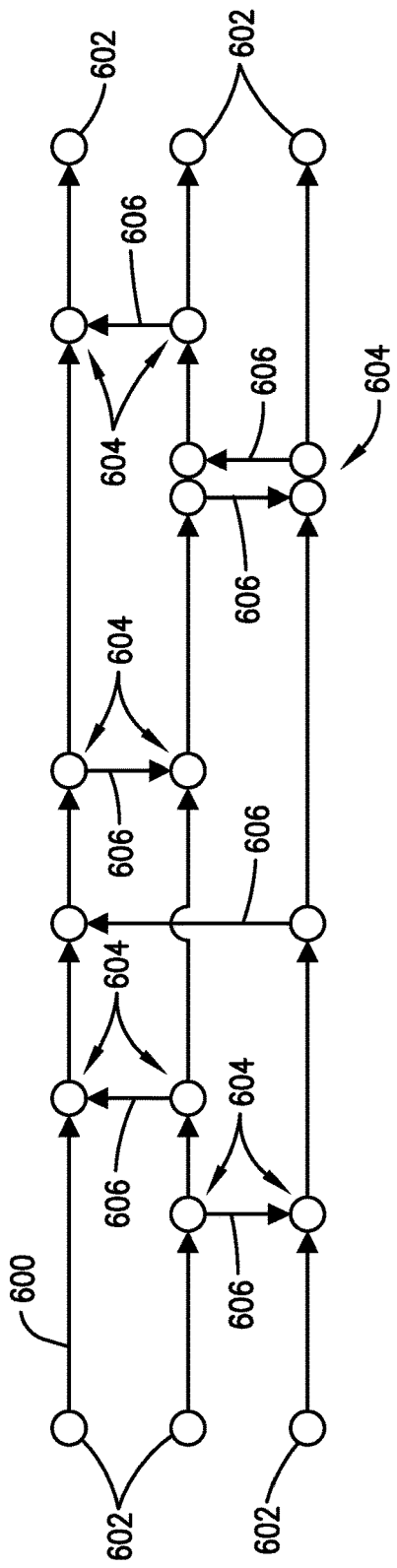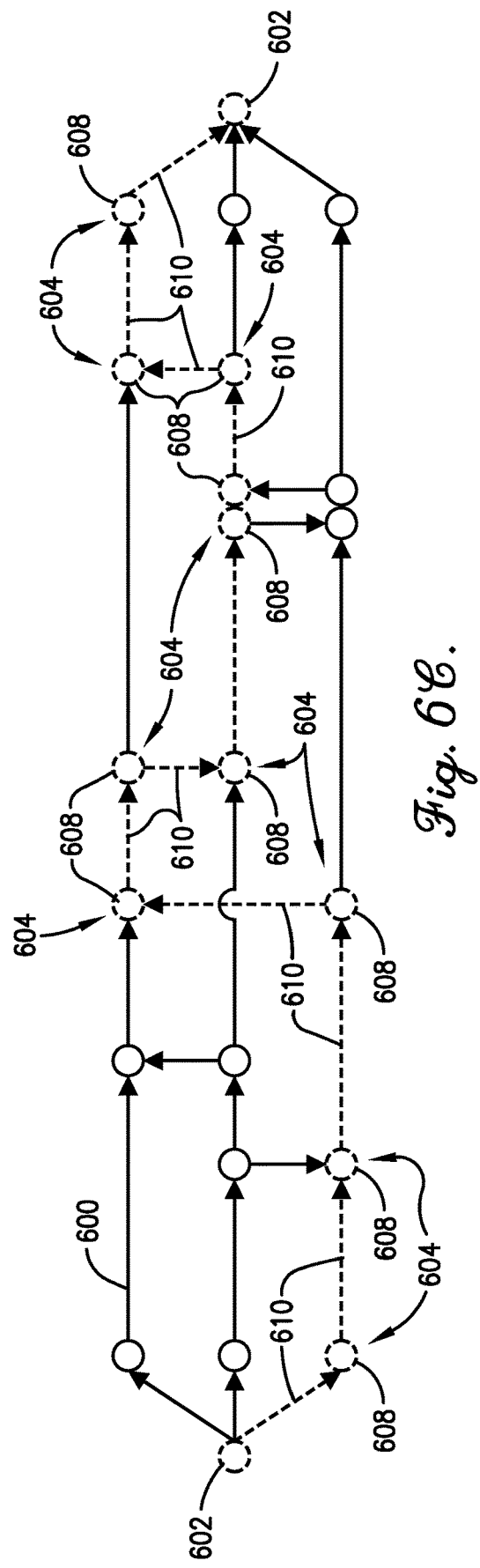

| LAP ▽ | LAP TIME ▽ | GAP ▽ | SECTOR 1 ▽ | SECTOR 2 ▽ | SECTOR 3 ▽ |
|---|---|---|---|---|---|
| 1 | 02:14.590 | +50.773 | 33.648 | 44.863 | 56.079 |
| 2 | 01:27.336 | +3.519 | 20.378 | 29.840 | 37.118 |
| 3 | 02:14.590 | BEST | 20.954 | 27.939 | 34.924 |
| 4 | 01:24.077 | +0.260 | 21.019 | 28.026 | 35.032 |
| 5 | 02:14.590 | +5.456 | 33.648 | 44.863 | 56.079 |
| 6 | 01:27.336 | +2.456 | 20.378 | 29.840 | 37.118 |
| 7 | 02:14.590 | +1.345 | 20.954 | 27.939 | 34.924 |

DRIVING ANALYSIS AND INSTRUCTION DEVICE

RELATED APPLICATIONS

This non-provisional patent application claims the benefit under 35 U.S.C. § 119(e) of U.S. Provisional Application Ser. No. 62/775,614, entitled "DRIVING ANALYSIS AND INSTRUCTION DEVICE," filed Dec. 5, 2018. The above-referenced Provisional Application is hereby incorporated by reference in its entirety into the present application.

BACKGROUND

Vehicle racing of all kinds requires precision in turning, acceleration, and deceleration to minimize the time required for a user to travel around a racetrack (i.e., time required to complete a lap of a racetrack). The timing and amount of steering input (turning) and acceleration associated with maneuvering the vehicle at each moment depends on numerous factors, which may include one or more characteristics of the racetrack, environmental conditions, one or more characteristics of the vehicle, and a driving style of the racer. All of these factors influence a driver's ability to complete laps of the racetrack in a short duration of time on a consistent basis.

More specifically, individuals who operate a vehicle on a racetrack, such as a road having a combination of various turns and that begins and ends at a start/finish line, typically desire to improve their performance by reducing the duration of time required to complete a lap around the track. Experienced drivers and driving instructors are generally aware that driving a vehicle along one or more paths along the track (i.e., driving lines or racing lines) may enable the driver to complete a lap more quickly than other paths around the track. Inexperienced drivers are typically unaware of the desired paths along the track. Additionally, the geographic locations along the track where the vehicle begins to accelerate out of turns and where the vehicle begins to decelerate (brake) into turns influence a driver's performance.

Conventional driving analysis devices have various limitations. Some conventional driving analysis devices simply provide lap times by determining the duration of time that passed for the vehicle to return to a geographic location corresponding to a start/finish line. Other conventional driving analysis devices include a GPS receiver that determines a time and a geographic location of the vehicle at a plurality of locations around the track. Some conventional driving analysis devices output the determined geographic location information to a computing device containing software that compares the vehicle's position at a plurality of points along the track (i.e., track log) to a stored reference track log, which may correspond to a prior performance by a reference driver who typically drove around the track in a shorter length of time than the driver whose data is being analyzed. The computing device may identify differences between the track log and the reference track log based on the comparison and present the identified differences on a display in a manner that may enable the driver to identify areas of his performance that may be improved to reduce the duration of time required to complete laps of the track (by reducing the number of differences between his performance and the reference performance). Other conventional driving analysis devices record video footage of one or more field(s) of view as the vehicle travels around the track for subsequent playback by the driver (after completion of the activity) to identify areas of his performance that may be improved.

SUMMARY

Embodiments of the present technology provide devices and methods of improving vehicle racing performance by analyzing previous interactions by a user (a racer), determining an optimal path of travel for the vehicle, and providing feedback enabling the user to control the vehicle to utilize that optimal path of travel. The optimal path of travel may include various optimal characteristics of the racer, including a lateral position of the vehicle between the width of the racetrack, a velocity of the vehicle, acceleration of the vehicle, deceleration of the vehicle (such as braking), steering input provided by the racer to maneuver the vehicle, and other characteristics.

An embodiment of the invention is directed to a racing coach device. The racing coach device includes a memory device, an output device, and a processing element. The memory device is configured to store data representative of a first path of travel along a racetrack over a first time period and data representative of a second path of travel along the racetrack over a second time period. The processing element is coupled with the memory device and the output device. The processing element is configured to identify, for each of a plurality of geolocations along the racetrack, one of the first path of travel or the second path of travel that is associated with a shorter duration of time over which the driver traversed a segment of the path of travel associated with each of the plurality of geolocations. The processing element is further configured to determine an optimal path of travel along the racetrack based on the identified first and second path of travel for each segment of the path of travel at each of the plurality of geolocations that results in a calculated lap time to traverse the racetrack that is less than the first time period and the second time period. The processing element is further configured to control the output device to provide the determined optimal path of travel.

The racing coach device may further include a display, a speaker, a location determining component (e.g., a GPS receiver), a camera, and a motion sensor (e.g., an accelerometer, a magnetometer, a tilt sensor, an inclinometer, a gyroscope, etc.), or any combination thereof, that assesses a driver's performance to determine one or more recommendations that may enable the driver to improve his performance in real-time as well as after completion of the activity. The racing coach device may be removably mounted within a vehicle operated by the driver along a racetrack. In such embodiments, the racing coach device includes a housing that enables the device to be mounted to the vehicle. For example, the racing coach device may be mounted on a windshield, dashboard or exterior of the vehicle and oriented to capture footage of a field of view in front of the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 6A:
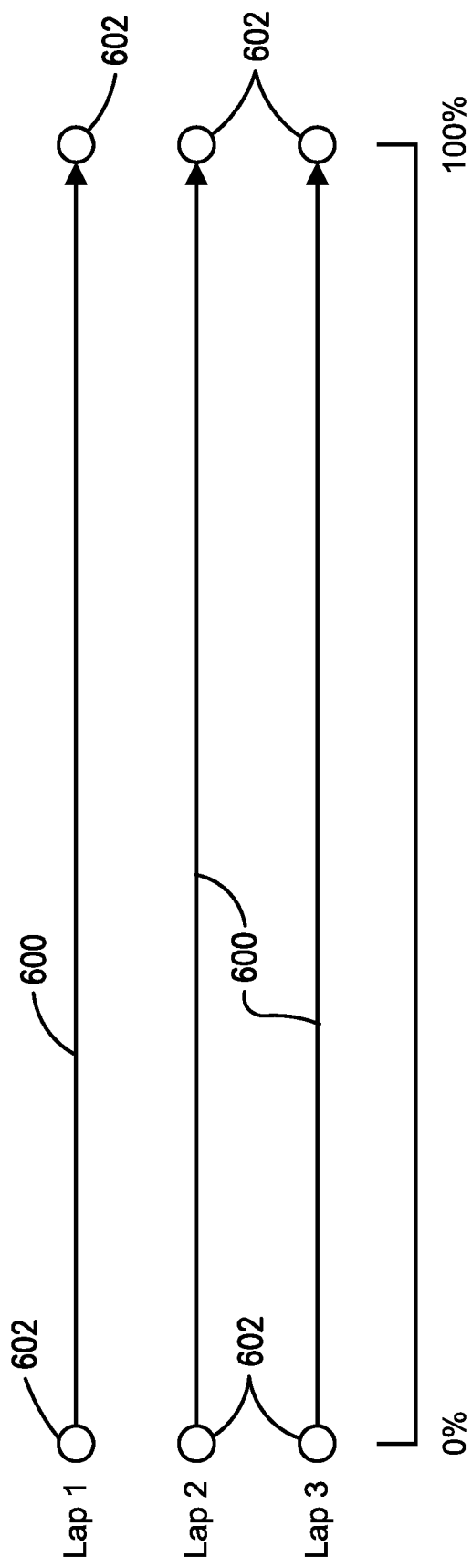
Figure 7:
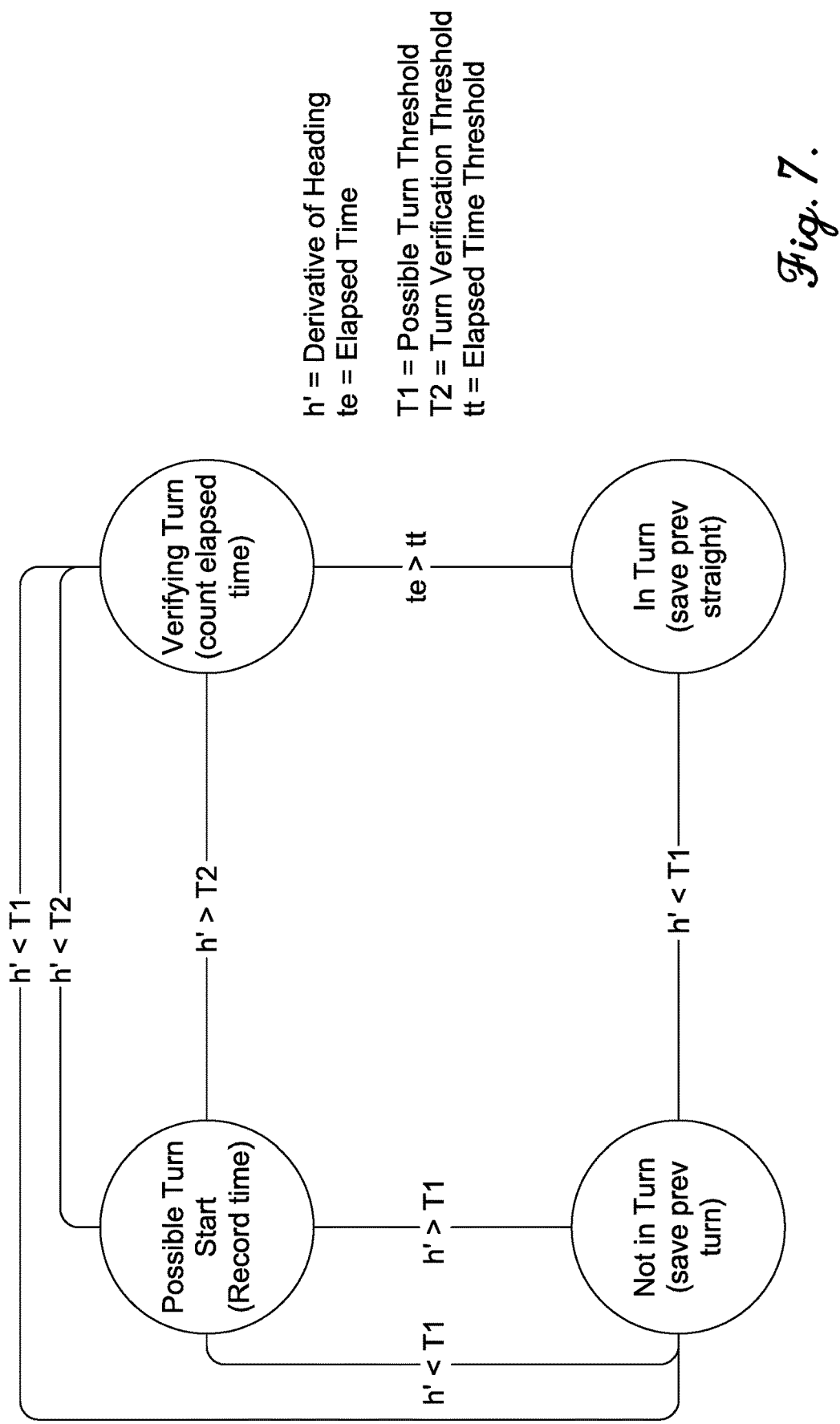
Figure 8B:
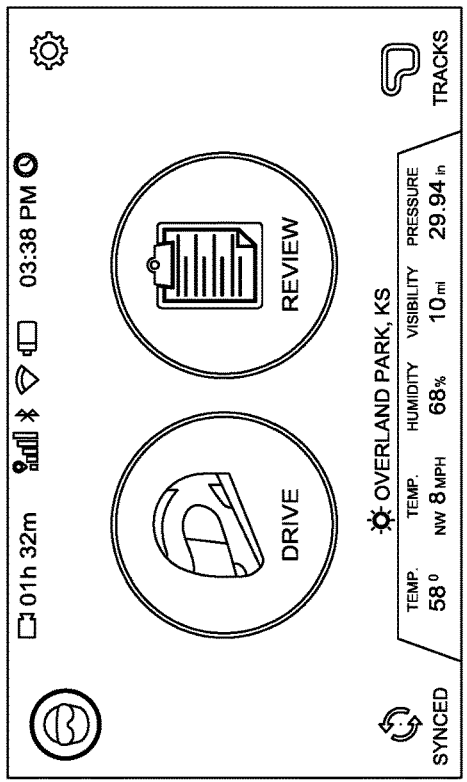
Figure 8C:
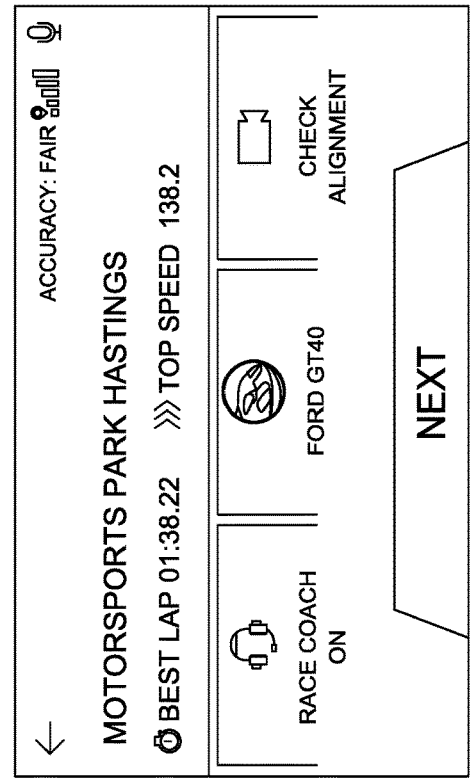
Figure 8A:
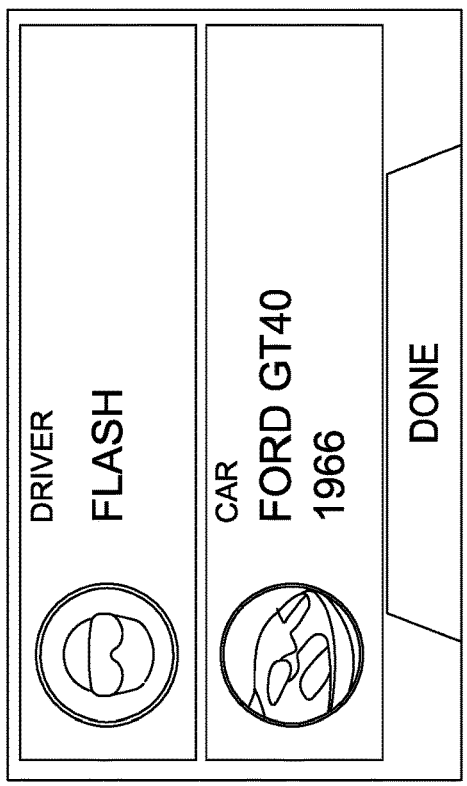
Figure 9A:
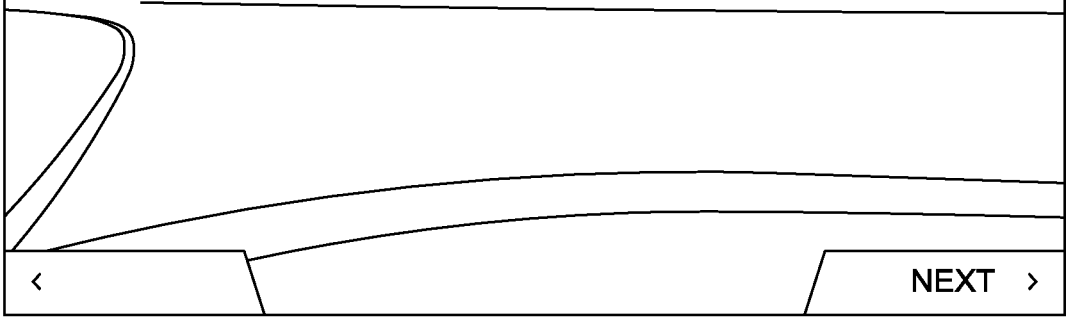
Figure 9B:
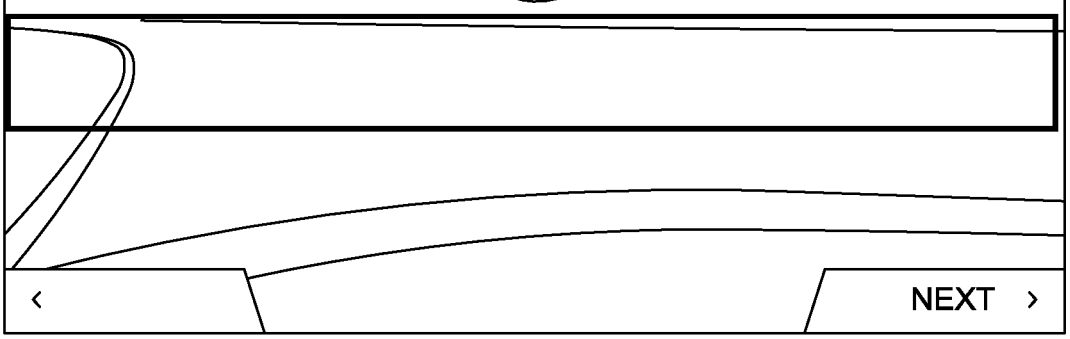
Figure 10A:
Figure 10B:

FIGS. 6A, 6B, and 6C is a directed acyclic graph of a method of determining an optimal lap;

FIG. 7 is a schematic view of a method for determining whether the vehicle is currently in a turn of the racetrack;

FIGS. 8A, 8B, and 8C are exemplary graphical user interfaces shown on a display in relation to setting up a race;

FIGS. 9A and 9B are exemplary graphical user interfaces shown on the display in relation to aligning a camera of the racing coach device;

FIGS. 10A and 10B are exemplary graphical user interfaces shown on the display during the race; and FIGS. 11A, 11B, 11C, and 11D are exemplary graphical user interfaces shown on the display regarding improvements the driving can make in subsequent races.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the present technology can include a variety of combinations and/or integrations of the embodiments described herein.

Exemplary Environment

Embodiments of the present technology relate to improving racing performance by analyzing previous laps, each typically associated with a vehicle traveling along a slightly different path of travel, determining an optimal path of travel for the automobile, and providing feedback enabling the user to control the vehicle to utilize that optimal path of travel. The determined optimal path of travel may be formed of a path of travel for one or more previous laps and may reflect various optimal characteristics of the racer, including a lateral position of the vehicle between the width of the racetrack, a velocity of the vehicle, acceleration of the vehicle, deceleration of the vehicle (such as braking), steering input provided by the racer to maneuver the vehicle, and other characteristics.

Figure 1:
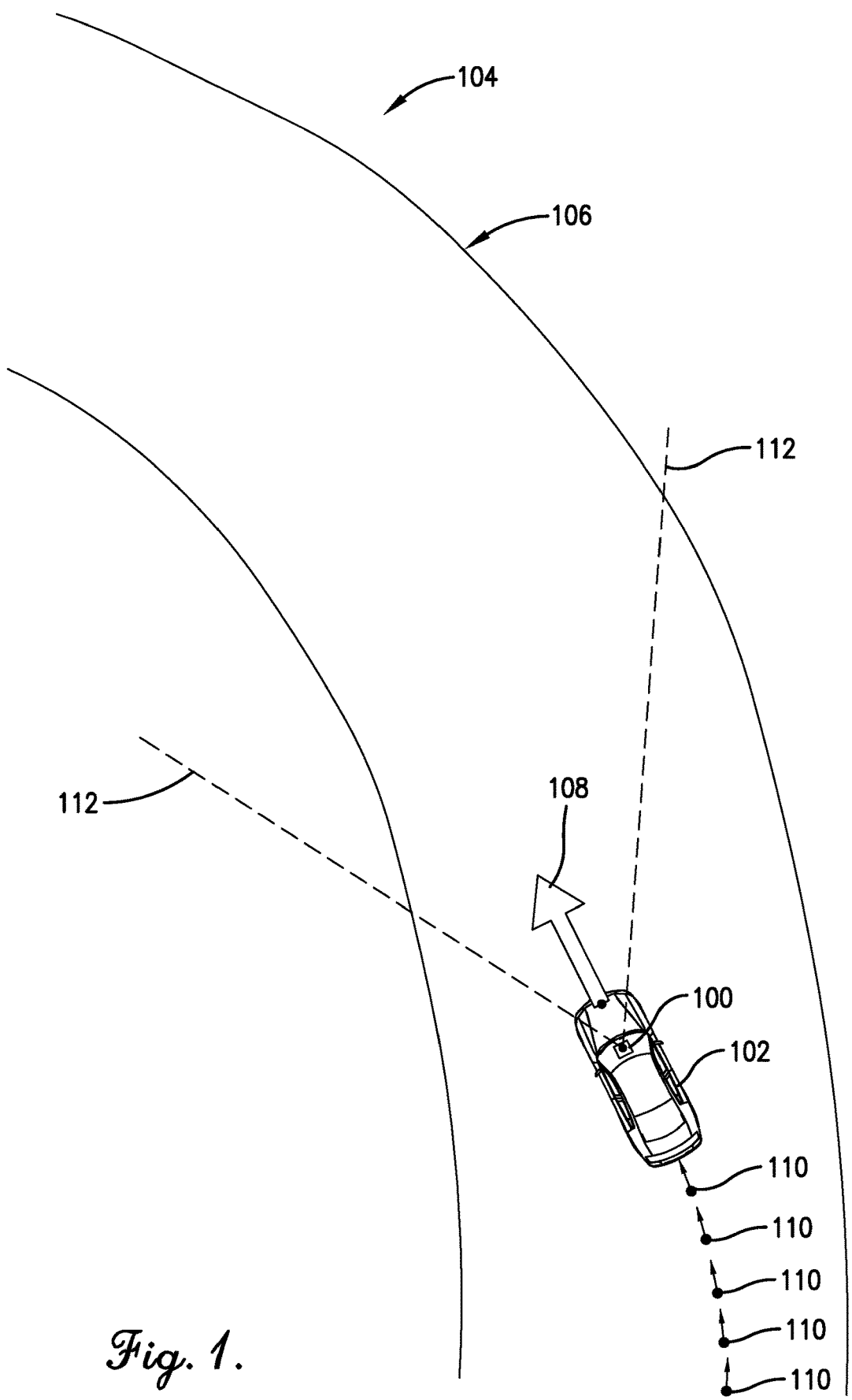
FIG. 1 is a view of an environment in which a racing coach device, constructed in accordance with various embodiments of the present technology, would operate.

Embodiments of the technology will now be described in more detail with reference to the drawing figures. Referring initially to FIG. 1, a racing coach device 100 for monitoring and improving race driving is illustrated. The racing coach device 100, constructed in accordance with various embodiments of the current technology, is configured to be used within, mounted to, or otherwise associated with an automobile 102 (or other vehicle). The racing coach device 100 determines a lateral position of the automobile 102 between the width of a racetrack 104 or other route. The racetrack 104 may include a plurality of corners 106. One or more sensors of (or in communication with) racing coach device 100 positioned within or mounted to the automobile 102 are configured to determine a plurality of vehicle parameters associated with the automobile 102, including but not limited to, a geolocation of the automobile 102 on the racetrack 104, a lateral position of the automobile 102 between the width of the racetrack 104, motion data (e.g., a velocity of the automobile 102, a rate of acceleration of the automobile 102, a rate of deceleration of the automobile 102, etc.), and a current heading 108 of automobile 102. In embodiments, the geolocation may include or incorporate the lateral position of the automobile 102. The racing coach device 100 may receive motion data from one or more motion sensors and may determine a current heading 108 based on a plurality of geolocations of the automobile 102. The racing coach device 100 determines and stores the vehicle parameters for the automobile 102 at a series of locations 110 approaching the turn of the racetrack 104 for the current lap and previous laps. The racing coach device 100 may further include a camera, discussed below, with a field of view 112 such that the racing coach device 100 captures footage of the racetrack 104 and the racing coach device 100 determines a lateral position of the automobile 102 between the width of the racetrack 104 based on the captured footage.

Figure 2:
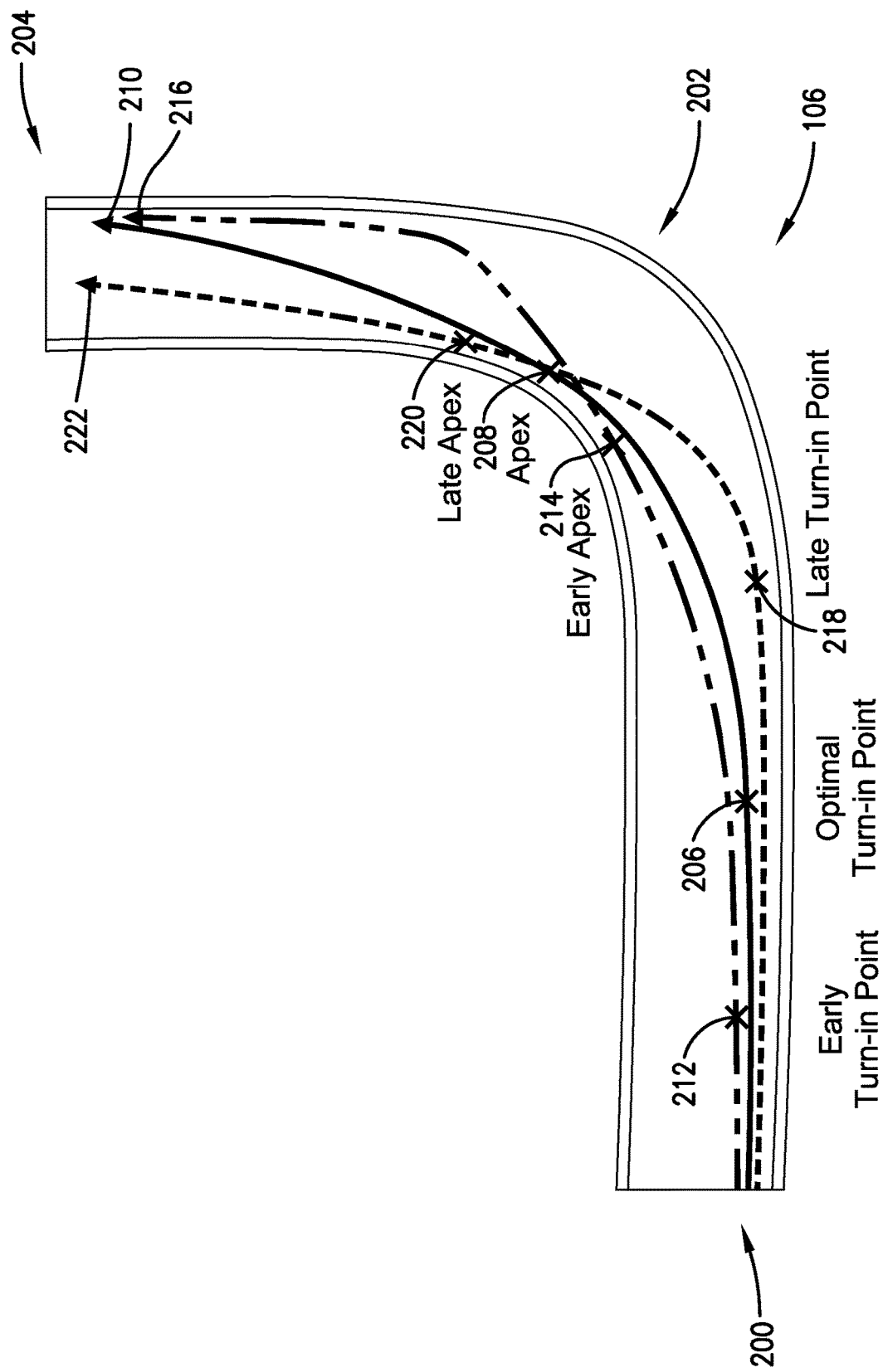
FIG. 2 is a view of a turn of a racetrack of the environment, illustrating how steering input affects driving performance.

The corner 106 depicted in FIG. 1 is shown in more detail in FIG. 2. Similar to other corners of the racetrack 104, corner 106 has an entry 200, a mid-point 202, and an exit 204. FIG. 2 shows three exemplary paths along which the automobile 102 traveled through the corner 106 based in part on steering input provided by the racer (denoted with points where the driver turns in to the corner 106). As can be seen in FIG. 2, the location at which the racer begins providing steering input to turn the automobile 102 affects the velocity and the rate of acceleration and deceleration of the automobile 102 at the entry 200, mid-point 202, and exit 204 of the corner 106. For instance, in this example depicted in FIG. 2, when traveling along the segment associated with path of travel 210, the racing coach device 100 may determine that the automobile 102, when traveling along path of travel 210 in comparison to paths of travel 216 and 222, has an optimal lateral position, velocity, and rate of deceleration at entry 200 and when steering input provided by the racer to maneuver the vehicle begins at an optimal turn-in point 206, the automobile 102 arrives at a apex 208 (located at a mid-point 202 of the corner 106) and has an optimal lateral position, velocity, and rate of acceleration at exit 204 of the corner 106. In contrast, when traveling along the segment associated with path of travel 216, the automobile 102 has a less-than-optimal lateral position, velocity, and rate of deceleration at entry 200 and when steering input provided by the racer to maneuver the vehicle begins at an early turn-in point 212, the automobile 102 comes to an early apex 214 and has a less-than-optimal lateral position, velocity, and rate of acceleration at exit 204 of the corner 106. Similarly, when traveling along the segment associated with path of travel 222, the automobile 102 has a less-than-optimal lateral position, velocity, and rate of deceleration at entry 200 and when steering input provided by the racer to maneuver the vehicle begins at a late turn-in point 218, the automobile 102 comes to a late apex 220 and has a less-than-optimal lateral position, velocity, and rate of acceleration at exit 204 of the corner 106. Thus, with appropriate application of steering input, acceleration and braking, travel of the automobile 102 along path of travel 210 is a faster path than paths of travel 216, 222 for automobile 102 to traverse corner 106. Specifically, racing coach device 100 is configured to identify that path of travel of travel 210 is completed over a shorter duration of time than path of travel 216 and path of travel 222.

Apex 208, 214, and 220 represent examples of points at which the automobile 102 is the closest to a center of a corner 106 along the inside of the racetrack 104. As such, a lateral position of the automobile 102 through the corner 106 may be analyzed by the racing coach device 100 to determine whether the automobile 102 drove through one of apexes 208, 214, and 220, as discussed below. Embodiments of the invention monitor operation of the automobile 102 as the driver traverses the corner 106 of the racetrack 104 and other portions of the racetrack 104 to identify an optimal path of travel, which may include an optimal turn-in point, as well as other aspects and characteristics of the race (as discussed above, such as acceleration, speed, lateral position, acceleration (or deceleration), heading, or altitude). It is to be understood, that the optimal path of travel for certain corners and other portions of the racetrack 104 may not include (pass through) apex 208. Rather, depending on the layout of the racetrack 104, an optimal path of travel may include (pass through) early apex 214 or late apex 220 based on the period of time required for automobile 102 to travel the associated segment of the racetrack 104. Embodiments of the invention provide driver-specific suggestions based upon a driver-specific optimal path that is calculated as discussed below.

It should be appreciated that the present disclosure discusses embodiments of the invention directed to automobiles and automobile racing. However, this discussed field of use is only exemplary. Racing coach devices may be utilized in any of numerous racing disciplines while being within the scope of the invention. Examples of other racing disciplines which may utilize embodiments of the invention include foot races, skiing/snowboarding races, bike races, sailing races, speedboat races, and/or aircraft races. As long as these racing disciplines utilize a well-established routes, similar techniques hardware components and techniques may be utilized to improve the racing performance by providing and instructing a driver-specific optimal path through the route.

It should therefore be noted that throughout the description, "automobile" could be replaced by "person," "bicycle," "boat," "aircraft," or other similar word. Similarly, "driver" could be replaced by "racer." It should also be appreciated that the driver may be interacting with the racing coach device in some instances, where in other instances a physical coach may be present and interacting with the racing coach device. As such, the "driver" could be replaced with "coach," "person," or other "user."

Exemplary Hardware Component

Figure 3A:
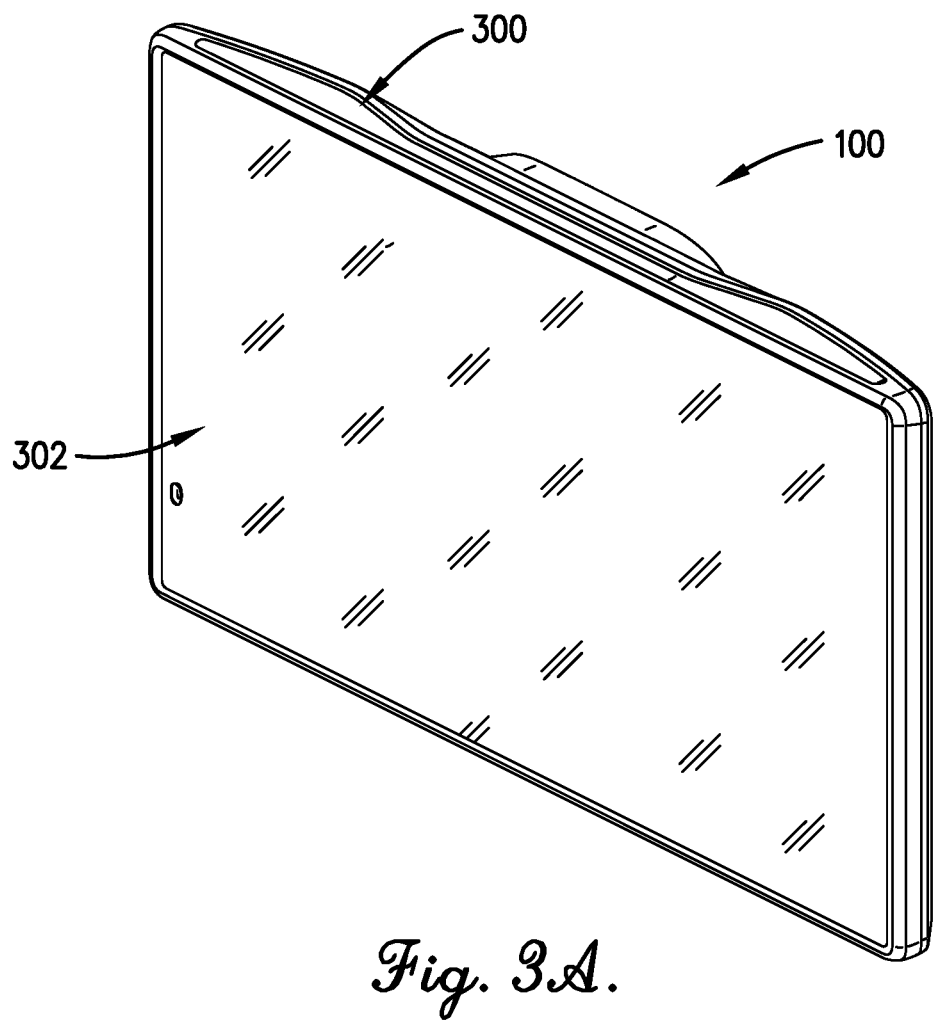
FIGS. 3A and 3B are perspective views of the racing coach device of one embodiment of the invention, including a schematic view of internal components.
Figure 3B:
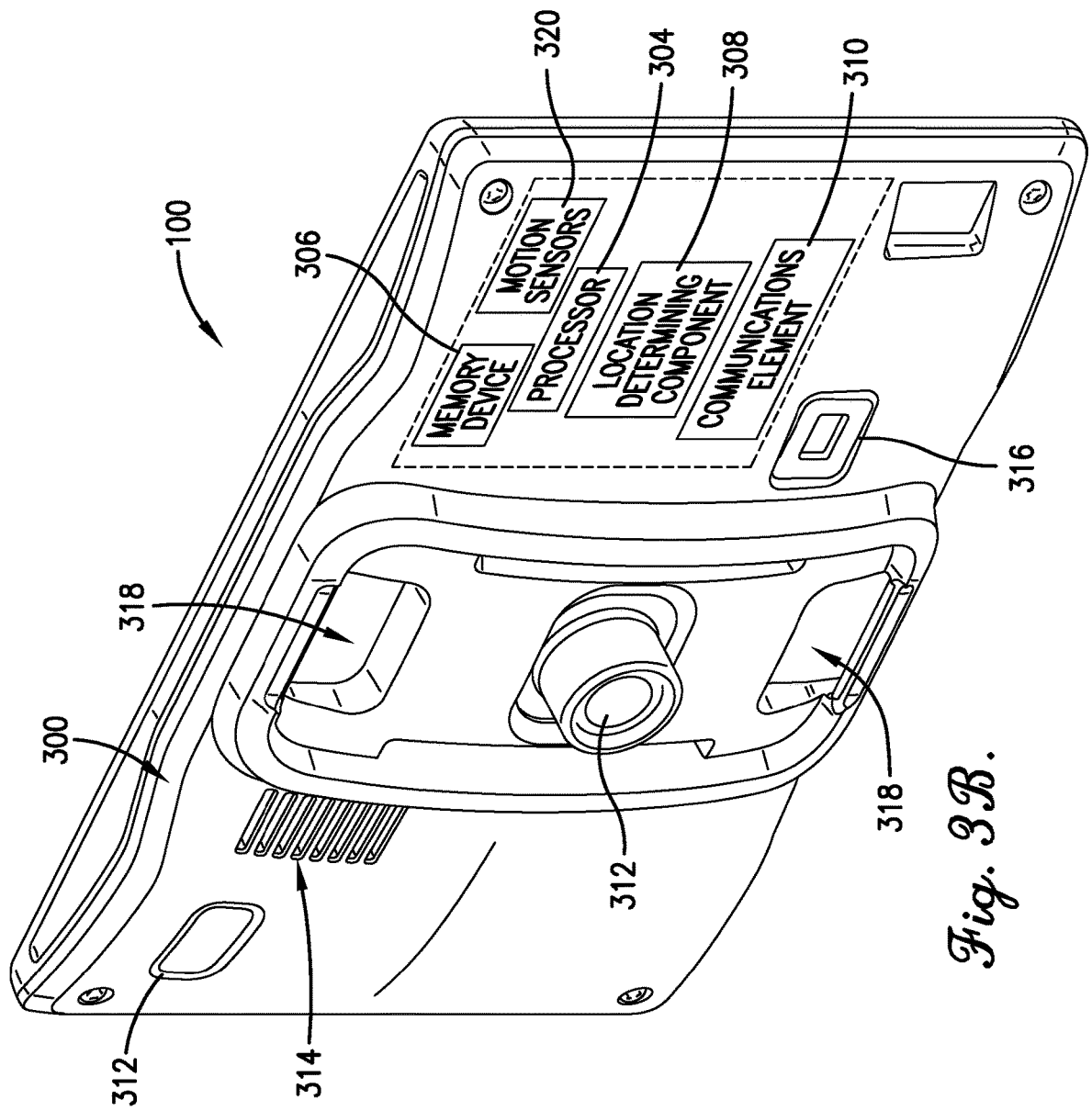
Figure 5:
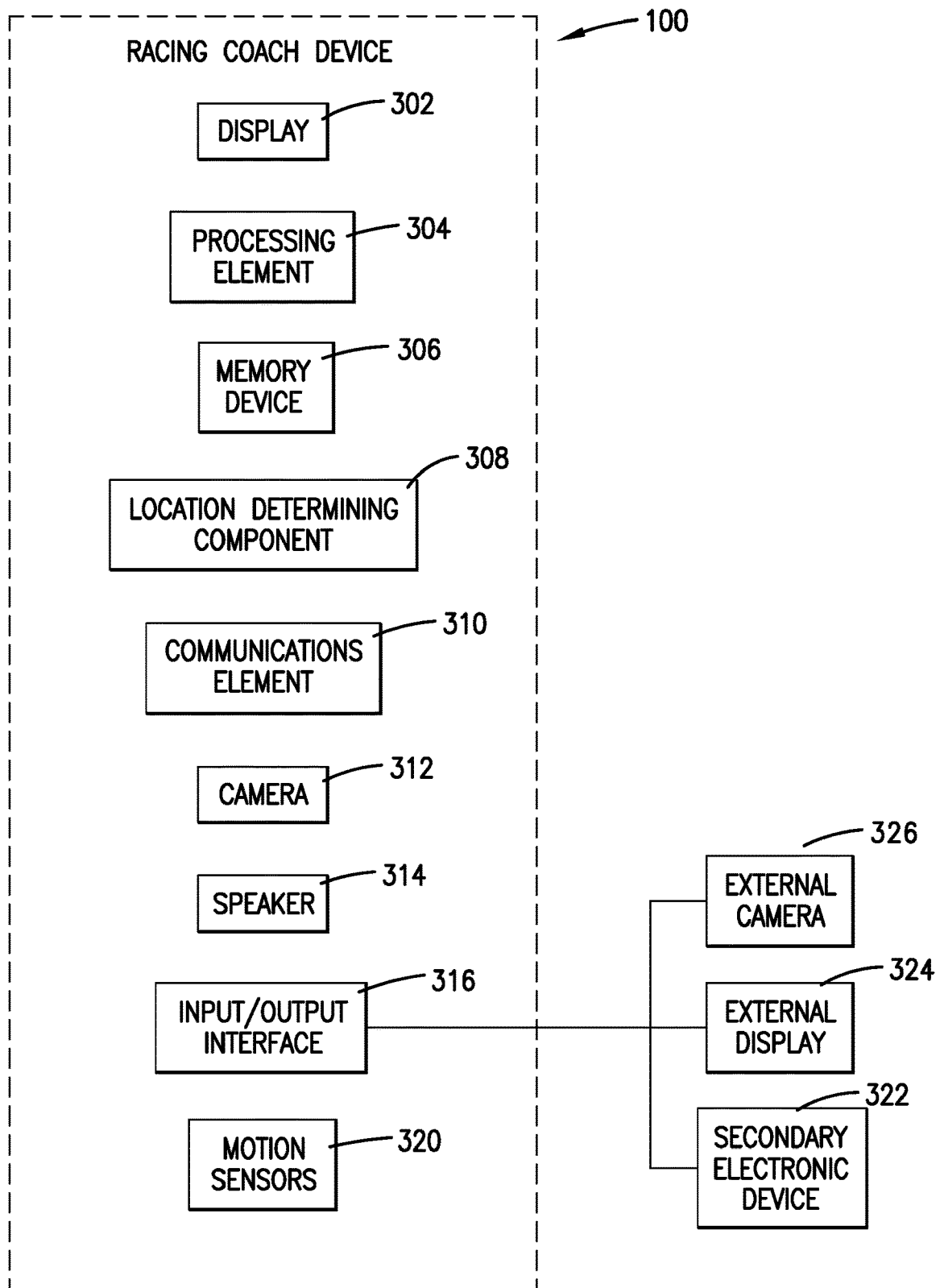
FIG. 5 is a schematic block diagram illustrating various electronic components of the racing coach device.

Turning to FIGS. 3A, 3B and 5, exemplary hardware of the racing coach device 100 is shown. In embodiments of the invention, the racing coach device 100 is an electronic device configured to be utilized within the automobile 102. The racing coach device 100 may be mounted via various mounting hardware (not illustrated) such that the racing coach device 100 is secure within the automobile 102. In other embodiments (not illustrated) the racing coach device 100 may be another computing device, such as a smart phone, a smart watch, a tablet computing device, or a laptop computing device. In embodiments of the invention, the racing coach device 100 comprises a housing 300, a display 302, a processing element 304, a memory device 306, a location determining component 308, a communication element 310, a camera 312, a speaker 314, a input/output interface 316 (electrically coupled with an external display 324 and/or an external camera 326), a mount receiver 318, and/or one or more motion sensors 320. The display 302, the speaker 314, and/or the input/output interface 316 may be individually or collectively referred to as an output device.

The housing 300 generally encloses and protects the components of the racing coach device 100 from moisture, vibration, and impact. In one embodiment, the housing 300 is a rugged housing 300. The housing 300 may be constructed from a suitable lightweight and impact-resistant material such as, for example, plastic, nylon, aluminum, or any combination thereof. The housing 300 may include one or more appropriate gaskets or seals to make it substantially waterproof or resistant. The housing 300 may take any suitable shape or size, and the particular size, weight and configuration of the housing 300 may be changed without departing from the scope of the present technology. In some embodiments, the housing 300 may include mounting hardware for mounting the racing coach device 100 to the automobile 102 (e.g., a ball and socket mount may be used to secure the housing 300 to a windshield or dashboard of the automobile 102). In other embodiments, the housing 300 may be worn on a wrist of the driver as the automobile 102 is driven around the racetrack 104 (e.g., a watch).

In some embodiments, the racing coach device 100 includes a housing 300 that enables the device to be mounted to the automobile 102 and/or held in the user's hands. For example, the racing coach device 100 may be mounted on a windshield, dashboard, or exterior of the automobile 102 and oriented to capture footage of a field of view 112 in front of the automobile 102. Alternatively, the racing coach device 100 may be mounted on or near a rear windshield board or exterior of the automobile 102 and oriented to capture footage of a field of view behind the automobile 102.

The display 302 (and external display 324) may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), electronic paper display (E Ink), or the like, or combinations thereof. The display 302 and external display 324 may possess a circular or a square shape or the display 302 and external display 324 may include a rectangular aspect ratio (as illustrated in FIG. 3A for display 302) that may be viewed in either a landscape or a portrait mode. In various embodiments, the display 302 may also include a touch screen occupying the entire screen or a portion thereof so that the display functions as a user interface. The touch screen may allow the driver to interact with the racing coach device 100 by physically touching, swiping, or gesturing on areas of the screen. The touch screen may be referred to as an input device of the racing coach device 100.

The processing element 304 may include one or more processors, microprocessors, microcontrollers, digital signal processors (DSPs), field-programmable gate arrays (FPGAs), analog and/or digital application-specific integrated circuits (ASICs), or the like, or combinations thereof. The processing element 304 may generally execute, process, or run instructions, code, code segments, software, firmware, programs, applications, apps, processes, services, daemons, or the like, or may step through states of a finite-state machine, or combinations of these actions. Machine learning techniques may also be implemented by the processing element 304. The processing element 304 may be in communication with the other electronic components through serial or parallel links that include address busses, data busses, control lines, and the like.

The processing element 304 may be configured to retrieve, process and/or analyze data stored in memory device 306, to store data in memory device 306, to replace data stored in the memory device 306, to analyze data or signals, capture video and/or image data, generate data, receive commands, control various functions of the systems, etc. In some configurations, the processing element 304 may consist of a single microprocessor or microcontroller. However, in other configurations, the processing element 304 may comprise a plurality of processing devices (e.g., microprocessors, DSPs, etc.), such that each processor is configured to control and perform different operational functions. For example, the first processor may be utilized to perform operational functions, such as analyzing the data received from the camera, and the second processor may control the presentation of information provided to the driver on the display 302.

The memory device 306 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory (e.g., SD card), thumb drives, universal serial bus (USB) drives, or the like, or combinations thereof. The memory device 306 may include, or may constitute, a "computer-readable medium". The memory device 306 may store the instructions, code, code segments, software, firmware, programs, applications, apps, services, daemons, or the like that are executed by the processing element 304. The memory device 306 may also store settings, data, documents, sound files, photographs, movies, images, databases, and the like.

Over time, the processing element 304 may store in memory device 306 geolocation data, image and video data, motion data, as well as statistical data to help the driver improve his driving performance. The statistical data may include, for example, lap times (e.g., average lap time, best lap time, worst lap time, etc.), sector times (e.g., by dividing the racetrack 104 into three sectors of approximately equal length or anticipated time of completion), segment times (by dividing the racetrack 104 into more than 3 segments), a path of travel (i.e., driving lines or racing lines), a top speed, an entry speed for each turn, an exit speed for each turn, portion(s) of the racetrack 104 associated with good performance, portion(s) of the racetrack 104 associated with poor performance, heart rate (e.g. max heart rate and average heart rate, etc.), a statistical measure of the drivers consistency during the session to demonstrate a mastery of the racetrack 104 (lap time repeatability), and a difference between average lap times. The processing element 304 may also store in the memory device 306 a video clip associated with each segment, sector, lap, or session for subsequent replay by the user on the internal display 302 or the external display 324. The stored video clips may also be combined to provide a video representation of the below-discussed optimal path. The processing element 304 may also store the spliced video of the optimal path in the memory device 306. The statistical data and related information may be provided to the driver in real-time or after completion of the activity.

The memory device 306 is configured to store a first path of travel along a racetrack 104 over a first time period and a second path of travel along the racetrack 104 over a second time period. The memory device 306 may receive the respective paths of travel based on geolocation data determined by the location determining component 308 while the automobile 102 is traveling along the racetrack 104. This allows the subsequent laps to be compared and combined. The combined laps may form an optimal lap, an average lap, or other composite lap. These composite laps may be compared, presented as recommendations, or the like. Thus, the memory device 306 may store sets of geolocations, timestamps, sensor readings, and other information for further analysis as discussed below. The memory device 306 is configured to a store a threshold distance corresponding to the segment of the path of travel associated with each of the plurality of geolocations, as discussed below.

Generally, the location determining component 308 determines a current geolocation of the racing coach device 100 and may process location signals, such as radio frequency (RF) electronic signals, received from a global navigation satellite system (GNSS), such as the Global Positioning System (GPS) primarily used in the United States, Wide Area Augmentation System (WAAS), the GLONASS system primarily used in the Soviet Union, the Galileo system primarily used in Europe, or the BeiDou system primarily used in China, and Ground-Based Augmentation System (GBAS). The location determining component 308 may include satellite navigation receivers, processors, controllers, other computing devices, or combinations thereof, and memory, utilized to generate geolocation data. The location determining component 308 may be in electronic communication with an antenna that wirelessly receives location signals from one or more of the previously mentioned satellite systems and provides the location signals to the location determining component 308. The location determining element 308 may process the location signals, which includes data and information, from which a current geolocation is determined and associated geolocation data is generated. The current geolocation may include geographic coordinates, such as the latitude and longitude, of the current geographic location of the racing coach device 100 as well as the speed, heading, and lateral position of the racing coach device 100 (and, as a result, the automobile 102). The location determining component 308 may communicate the geolocation data to the memory device 306 for storage and/or the processing element 304. Thus, the location determining component 308 is configured to receive location signals and determine a current geolocation of the racing coach device 100 (and the automobile 102 in which the racing coach device 100 is located) using the received location signals.

The communication element 310 generally enables communication between the racing coach device 100 and external systems or devices. The communication element 310 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element 310 may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as WiMAX, Bluetooth™, or combinations thereof In addition, the communication element 310 may utilize communication standards such as ANT, ANT+, Bluetooth™ low energy (BLE), the industrial, scientific, and medical (ISM) band at 2.4 gigahertz (GHz), or the like. The communication element 310 may be in communication with the processing element 304 and the memory device 306. In various embodiments, the racing coach device 100 may be configured to establish communication with more than one protocol or standard, and the communication element 310 may include a transceiver for each protocol or standard, such as Bluetooth™, Wi-Fi, cellular, etc., with which the racing coach device 100 can communicate. The communication element 310 may be in electronic communication with an antenna that wirelessly transmits and receives electronic signals to and from other electronic devices, such as a smartphone, a tablet, a laptop, or a desktop computer, or communication network interfaces such as a Wi-Fi router or a cell tower. In embodiments, the racing coach device 100 may wirelessly receive image and video data from an external camera 326 via a wireless connection through the communication element 310.

The camera 312 generates images and/or video data of the field of view 112 captured by the camera 312 (the "video data" or the "image data"). The camera 312 is configured to capture image data (video data when footage is aggregated over time) including consecutive frames of the road and objects in the field of view 112 of the camera 312. In one embodiment, the camera 312 may selectively capture image data in response to one or more predetermined events determined to have occurred or conditions determined to have been satisfied by processing system. In another embodiment, the camera 312 may continuously capture image and/or video data. The camera 312 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality. In embodiments, the camera 312 captures in each frame the objects present in the field of view 112. The camera 312 may create many such frames each second. The camera 312 may store the image and/or video data to any suitable portion of memory device 306, which may be stored in a "rolling buffer" format such that stored data is overwritten periodically, such as every 15 minutes or every hour, unless a user provides an input to the user interface indicating that the image data is no longer desired to be collected and stored in memory device 306.

For the ease of discussion, camera 312 is described as positioned within housing 300, but it is to be understood that an external camera 326 in communication with the racing coach device 100, via the communication element 310 or the input/output interface 316, operates similar to camera 312 and processing element 304 utilizes data and information received from the external camera 326 as described herein for data and information received from camera 326.

In some embodiments, the racing coach device 100 may include two or more cameras. For the ease of discussion, the description that follows primarily refers to the use of one camera 312; however, it should be understood that the description also applies to embodiments in which the racing coach device 100 includes two or more cameras. Embodiments including two optical cameras may be advantageous for a variety of purposes, such as determining the location of and tracking objects along the racetrack 104 (a distance may be determined by using two images spaced laterally and applying techniques such as binocular depth perception). The racing coach device 100 may be removably mounted within the automobile 102 operated by the driver along a racetrack 104. In such embodiments, the racing coach device 100 includes a housing 300 that enables the racing coach device 100 to be mounted to the automobile 102 (as discussed above). For example, the racing coach device 100 may be mounted on a windshield, dashboard or exterior of the automobile 102 and oriented to capture footage of a field of view 112 in front of the automobile 102. The camera 312 may be independently movable relative to the racing coach device 100. Alternatively, the racing coach device 100 may be mounted on or near a rear windshield board or exterior of the automobile 102 and oriented to capture footage of a field of view behind the automobile 102. It is to be understood that the camera 312 may be mounted such that the field of view may exist in any direction from the automobile 102 (e.g., left side, right side, etc.). In some embodiments, the camera 312 may be an omnidirectional camera having a 360-degree field of view around the automobile 102 within or on which the camera 312 is mounted.

In embodiments, the processing element 304 may be configured to perform video analysis techniques (using a suitable video processing algorithm) on image (and/or video) data that may be stored in the memory device 306. The suitable algorithms may include one or more of a linear classifier algorithm, a support vector machine algorithm, a quadratic classifier algorithm, a kernel estimation algorithm, a boosting meta-algorithm, a decision tree algorithm, a neural network algorithm, a learning vector quantization algorithm, or other suitable algorithm. The processing element 304 may analyze image data of the field of view 112 to identify a current position of the racing coach device 100 on the racetrack 104 (e.g., straight, approaching turn, in turn, start/finish line, etc.) and a lateral position of the automobile 102 within a width of the racetrack 104. To do so, the processing element 304 may be configured to retrieve from memory device 306 and analyze one or more frames of image and/or video data to identify a portion of the racetrack 104 and a lateral position of the automobile 102 within the racetrack 104. In embodiments, the processing element 304 may analyze image data received from the camera 312 to determine a distance to a turn and a lateral position of the automobile 102 as it approaches the corner 106.

The racing coach device 100 may include a speaker 314 and/or an audio-output device (not illustrated) utilized to output audible recommendations to the driver during the activity. The audio-output device may utilize an external speaker or headphone. For example, the audio-output device may receive a jack for a set of headphones worn by the driver during the race. As another example, the audio-output device may be a Bluetooth device that sends the audible recommendations to the speaker system of the automobile 102 for output of the audible recommendations.

The racing coach device 100 may include an input/output interface 316 that may enable interaction between racing coach device 100 and an external display 324, an external camera 326, or a secondary electronic device 322, such as a smartphone, tablet, or personal computer, having a processing element, memory device and/or user interface. In embodiments, an external display 324 and user interface may be utilized by racing coach device 100 to present performance information and provide user interface functionality. Racing coach device 100 may not include an internal display 302 and may utilize an external display 324 to present performance information and provide user interface functionality. Racing coach device 100 may supplement the functionality of the display 302 and user interface (discussed below) included in racing coach device 100 with an external display 324, external processing element, and/or external memory associated with the secondary electronic device 322. For example, racing coach device 100 may use input/output interface 316 to transmit performance data (unprocessed, semi-processed or fully processed) to enable a secondary electronic device 322 to provide a user interface and/or visual or audible information (using an external display 324 or speaker 314 associated with the secondary device), processing functionality (using a processing element 304 associated with the secondary device) or data storage functionality (using a memory element 306 associated with the secondary device). In some embodiments, external components may be operable to perform any of the functionality associated with the various internal components described herein.

The input/output interface 316 generally allows the user to upload data to, download data from, or adjust the settings of the racing coach device 100. The input/output interface 316 may be wired or wireless and may include antennas, signal or data receiving circuits, and signal or data transmitting circuits. The input/output interface 316 may transmit and receive radio frequency (RF) signals and/or data and may operate utilizing communication standards such as ANT, ANT+, Bluetooth™ low energy (BLE), Near Field Communications (NFC), or the like. In various embodiments, the input/output interface 316 may transmit and receive data using the industrial, scientific, and medical (ISM) band at 2.4 gigahertz (GHz). Furthermore, in some embodiments, the input/output interface 316 may communicate with a wireless dongle that connects to the USB port of a desktop, laptop, notebook, or tablet computer, or other electronic device. An exemplary input/output interface 316 includes an nRF51922 RF integrated circuit (IC) from Nordic Semiconductor of Trondheim, Norway. In embodiments, the racing coach device 100 may receive image and video data from an external camera 326 via a wired connection to the input/output interface 316.

The mount receiver 318 is comprises one or more openings configured to receive any of various mounting hardware, so as to secure the housing 300 within the automobile 102. For example, a ball-and-socket mounting hardware may be secured to a dashboard or windshield of the automobile 102. The mount receiver 318 is configured to interface with the mounting hardware so as to be removable secured. The mount receiver 318 may allow for a consistent orientation of the racing coach device 100 relative to the automobile 102. This may allow the display 302 and the camera 312 to be at a consistent orientation relative to the driver and field of view 112, respectively.

One or more motion sensors 320 may be contained within the housing 300 or communicatively coupled with the racing coach device 100. The one or more motion sensors 320 may be a component of the automobile 102, a component of another device within the automobile 102, and/or a component of the racing coach device 100. The motion sensors 320 may generate motion data associated with the movement of the automobile 102 as it travels around the racetrack 104. The motion sensors 320 generally senses motion of the racing coach device 100 and, in turn, the automobile 102 in which the racing coach device 100 is mounted (as discussed above). The motion sensors 320 may include accelerometers, tilt sensors, inclinometers, gyroscopes, magnetometers, combinations thereof, or other devices including piezoelectric, piezoresistive, capacitive sensing, or micro electromechanical systems (MEMS) components. The motion sensors 320 may sense motion along one axis of motion or multiple axes of motion, such as the three orthogonal axes X, Y, and Z. The motion sensor 320 generally communicates motion data to the memory device 306 and the processing element 304. The rate at which the one or more motion sensors 320 generate and communicate motion data to the memory device 306 and the processing element 304 may vary based on various criteria. The one or more motion sensors 320 thus generate data associated with the motion of the automobile 102. The processing element 304 may utilize geolocation data and motion data from one or more motion sensors 320 to determine a turn in real time, so as to aid in the provision of audible recommendations to the driver, as discussed in depth below.

Exemplary Methods Steps

Figure 4:
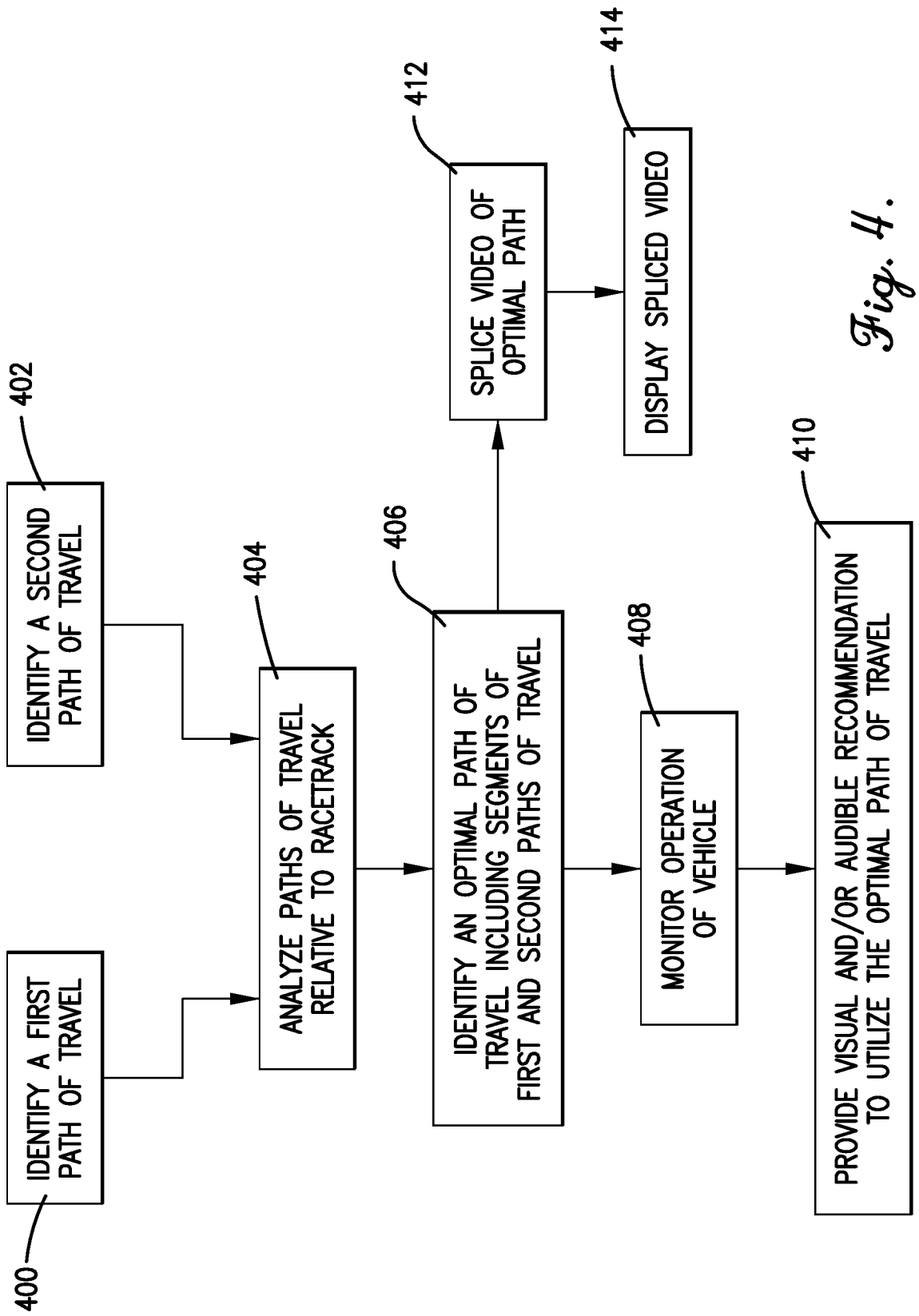
FIG. 4 is a flow diagram showing exemplary computerized method steps performed by the racing coach device.

Turning now to FIG. 4, an exemplary method performed by the above-discussed hardware components will now be described. Generally, the processing element 304 may determine and provide a recommendation to enable the driver to improve his performance on the racetrack 104. The processing element 304 may control display 302 and headset/speaker 314 to present or provide the determined recommendations in real-time or after completion of the activity. In embodiments, the racing coach device 100 may include a communication element 310 that enables the processing element 304 to transmit and receive signals (e.g., communication signals to or from a transceiver connected to the automobile's OBD-II interface) as well as data relating to a driver's driving performance and the racetrack 104. For instance, the racing coach device 100 may communicate with a smartphone or computing device to upload or download data and information to or from a remote server, such as Garmin Connect. In embodiments, the data received by the racing coach device 100 from a remote sever and stored in memory device 306 may include driving performance data (associated with the user or another driver) and the processing element 304 may utilize the received driving performance data as a reference racetrack log for use with evaluating the driver's driving performance and determining inefficiencies and associated driving recommendations.

The processing element 304 may determine whether the automobile 102 traveled through a corner along the optimal path and whether the traveled path was traveled at optimal speeds (e.g., an entry speed at entry 200, an apex speed at mid-point 202, and an exit speed at exit 204, etc.) to identify aspects of the driver's performance that may be improved. In embodiments, the processing element 304 may utilize the geographic location information received from the location determining component 308 as well as the motion data received from the one or more motion sensors 320 (e.g., deceleration associated with automobile 102 braking, acceleration associated with automobile 102 acceleration, lateral gravitational forces associated with automobile 102 resulting from accelerating, decelerating, and turning, etc.) to determine whether the automobile 102 traveled along an optimal path of travel at optimal speeds to identify aspects of the driver's performance that may be improved. For example, the processing element 304 may utilize the motion data to determine at which geographic locations along the racetrack 104 the automobile 102 decelerated (braked) and began turning as well as resumed accelerating to determine whether steering input was provided at the optimal turn-in point 206, the automobile 102 traveled through apex 208, and other aspects of the driving performance were optimal.

Once the below-discussed analysis is complete, the processing element 304 may control one or more output devices, such as display 302 and headset/speaker 314, to provide visual and audible feedback and recommendations as the driver continues to drive the automobile 102 around the racetrack 104. For example, the processing element 304 may output audio signals relating to the identified performance aspects after the automobile 102 completes a corner 106 and upon automobile 102 approaching corner 106 on a subsequent lap of racetrack 104. For example, the processing element 304 may determine and immediately notify the driver (via the display 302 and the headset/speaker 314) that the automobile 102 entered turn five too fast (as a result of incorrect braking) along a path of travel that caused automobile 102 to enter the turn wide and may result in a miss of the apex of corner 106.

In some embodiments, the processing element 304 may present visual information on the display 302 or control the headset/speaker 314 to output audio signals with a recommendation relating to an upcoming maneuver before the driver reaches the maneuver based on previously-identified aspects of the driver's performance that may be improved (i.e., the processing element 304 is providing a recommendation in anticipation of a maneuver in real-time based on past performance) or provide feedback on completed maneuvers, as discussed below. For example, if the processing element 304 determines that automobile 102 entered turn five too fast (as a result of late braking) along a path of travel that caused automobile 102 to enter the turn wide and miss the apex of the corner, the processing element 304 may determine and provide (via the display 302 and/or the headset/speaker 314) a recommendation relating to turn five at a time determined by the processing element 304 to provide sufficient time for the recommendation to be provided and understood by the driver, such as upon determining that the automobile 102 has completed turn four (per the turn analyzer discussed below). In this example, the determined recommendation may be for the automobile 102 to brake earlier for turn five in comparison to the previous lap, a suggested lateral position along the racetrack 104 for entry to turn five (e.g., at a lateral position towards one side of the racetrack 104 in comparison to the previous lap) and a reminder and instructions how to pass through apex 208 of turn five.

In Step 400, the processing element 304 identifies a first path of travel. The first path of travel may be based upon a lap of racetrack 104, or a segment thereof (e.g., a corner of racetrack 104, portions of racetrack 104 separated by a predetermined distance, such as 5 feet or 50 feet, etc.), by automobile 102. The first path of travel will include a set of geolocations and other vehicle parameters associated with a series of locations 110 of the automobile 102 as the automobile 102 traversed the first path of travel. The first path of travel is stored in memory device 306 such that it may be retrieved and analyzed by processing element 304, as discussed below.

In Step 402, the processing element 304 identifies a second path of travel. Similar to the first path of travel, the second path of travel may be based upon a lap of racetrack 104, or a segment thereof (e.g., a corner of racetrack 104, portions of racetrack 104 separated by a predetermined distance, such as 5 feet or 50 feet, etc.), by automobile 102. The second path of travel includes a set of geolocations and other vehicle parameters associated with a series of locations 110 of the automobile 102 as the automobile traversed the second path of travel. The second path of travel was utilized by automobile 102 on a lap other than the lap associated with the first path of travel. Therefore, some geolocations and other vehicle parameters may coincide with those associated with the first path of travel. The first path of travel and the second path of travel are two of many possible paths of travel for traversing one or more segments of the racetrack 104. The second path of travel is also stored in memory device 306 such that it may be retrieved and analyzed by processing element 304, as discussed below.

In Step 404, the processing element 304 analyzes the layout of the racetrack 104 and the first and second paths of travel to assess the performance of the driver. For instance, the processing element 304 may plot the two (and possibly additional) paths of travel onto the racetrack 104 to determine whether the driver maneuvered the automobile 102 through the racetrack 104 along an optimal path at optimal speeds to reduce the total duration of time required to complete a lap of the racetrack 104. The processing element 304 may plot the first and second paths of travel onto the racetrack 104 based on an analysis of the geolocation data, the video data, the sensor data, and the motion data, or any combination thereof.

The memory device 306 may store cartographic information, including geographic locations, for racetrack 104. In embodiments, the racing coach device 100 may download the cartographic information from a remote server or secondary electronic device 322. The processing element 304 may determine geolocations associated with and construct a shape for the racetrack 104 based on the geolocation data, the video data, the sensor data, and the motion data, or any combination thereof. The processing element 304 may determine a centerline along the racetrack 104, which will begin and end at the finish line of the racetrack 104, based on the location determining component 308 and lateral position information determined using footage generated by the camera 312. The geolocation data may include a geolocation, a heading, and a velocity (speed) of the automobile 102. The processing element 304 may determine the lateral position information based on an analysis of the video data generated by the camera 312. The determined lateral position may be given a numerical value, such as a zero associated with the left-most edge of the racetrack 104, a one associated with the right-most edge of the racetrack 104, and intermediate lateral positions having a value between zero and one. In embodiments, the processing element 304 may determine the centerline of the racetrack 104 based on cartographic information stored in memory device 306 associated with racetrack 104, which may include information such as a geographic location of a start/finish line, a width of the racetrack 104, a geolocation of a pit lane, a geolocation of a garage (pit) area, information associated with each turn of the racetrack 104, and other information about the racetrack 104.

The constructed shape of the racetrack 104 may be utilized to provide the various analysis functionality described herein. For example, the constructed shape can be used to identify validly recorded data (e.g., locations on the racetrack 104 as opposed to nearby locations, such as locations in a parking lot or pit area) and select valid data for analysis. Additionally or alternatively, the constructed shape of the racetrack 104 may be used to display the racetrack 104 and associated data to the user without requiring the use of a precompiled database of racetrack information. For instance, the track shapes illustrated in FIGS. 11A, 11B, and 11D may be generated using the constructed shape of the racetrack 104.

The user may utilize the device 100 at any racetrack, including those never before driven or mapped, and the device 100 may construct the shape of the racetrack 104 as, or after, the user completes a lap and/or segment, to assist in racing analysis. The user is therefore not limited to racing at a set of predefined racetracks. Additionally, in the event the configuration of the racetrack 104 changes, the constructed shape of the racetrack 104 may be dynamically updated by the device 100 to ensure that the user is provided accurate and up-to-date information. The constructed shape of the racetrack 104 may be stored within the memory 306 and/or distributed to remote servers, the secondary electronic device 322, and/or other users of similarly equipped devices 100. Additionally, the constructed shape of the racetrack 104 may be bundled with other information, such as the racing metrics described herein, to generate a complete dataset of information for the racetrack 104. The bundled dataset may be distributed in combination with other datasets to generate a global database of racetrack information.

In Step 406, the processing element 304 will determine an optimal path of travel for the automobile 102 that can be utilized by the driver based upon a plurality of stored paths of travel along racetrack 104. As discussed above, it is to be understood that a path of travel may be a lap of racetrack 104 or a segment thereof (e.g., a corner 106 of racetrack 104, portions of racetrack 104 separated by a predetermined distance, such as 5 feet or 50 feet, etc.).

An exemplary method of determining the optimal path of travel for the automobile 102 to travel for a full lap of racetrack 104 is shown in FIGS. 6A-6C via an acyclic graph. A timeline 600 for three laps is provided to illustrate performance at a plurality of geolocations along the racetrack 104. Although the three laps are labeled Lap 1, Lap 2, and Lap 3, it is to be understood the techniques disclosed herein apply to any three laps stored in the memory device 306 regardless of their order or source (e.g., data generated by racing coach device 100, data downloaded from a remote server, etc.). Processing element 304 may determine an optimal path of travel using data associated with two or more laps completed of racetrack 104 by the driver in automobile 102. For instance, any two non-sequential laps may be analyzed and used by the processing element 304 to determine the optimal path of travel at each of the plurality of geolocations of racetrack 104, which may correspond to any portion of the racetrack 104. For instance, the processing element 304 may determine an optimal path of travel associated with each of the corner 106, an approach to the corner 106, the entry 200, the apex 202, and the exit 204 of corner 106, and subsequently determine and refine the optimal path of travel as additional paths of travel 600 become available to the processing element 304 on a continuous (on-going) basis.

The processor is configured to identify, for each of a plurality of geolocations between the start/finish line 602 (associated with lap completion points of 0% and 100%), one of the first path of travel, the second path of travel, or the third path of travel that is associated with a shorter duration of time over which the driver traversed a segment of the respective path of travel associated with each of the plurality of geolocations. The processing element 304 identifies a plurality of segments (associated with determination points 604 shown in FIG. 6B) associated with a plurality of geolocations along the racetrack 104 to be analyzed. The processing element 304 is further configured to determine, at each of the plurality of geolocations, an optimal path of travel 610 along the racetrack 104 based on the identified first, second, and third paths of travel for each segment of the respective path of travel that, when combined, results in a calculated lap time to travel around the racetrack 104 that is less than a first time period over which the automobile 102 completed a lap of racetrack 104 along the first path of travel, a second time period over which the automobile 102 completed a separate lap of racetrack 104 along the second path of travel, or a third time period over which the automobile 102 completed a lap of racetrack 104 along the third path of travel, as shown in FIG. 6C.

Returning to FIG. 6B, the processing element 304 may identify a plurality of geographic locations, referred to as a set of determination points 604, at which processing element 304 selects one of the first, second or third paths of travel for a segment of the racetrack 104 associated with each of the plurality of geographic locations. For example, one of the plurality of determination points 604 may be a geographic location at a midpoint of (halfway through) the racetrack 104. The processing element 304 may then identify a performance improvement event 606 associated with a determination of one path of travel resulting in a reduction of time to traverse (drive through) the segment and the total lap time resulting from all segments of the racetrack 104 compared to other paths of travel (by taking into account the impact of all performance improvement events 606 at the plurality of geolocations along racetrack 104). For instance, if the processing element 304 determines that the second path of travel associated with a segment at the midpoint of the racetrack 104 is faster (results in a shorter duration of time for automobile 102 to travel the segment and the total lap time) than the first and third paths of travel for the segment, the processing element 304 will identify a performance improvement event 606 in favor of the second path of travel at the midpoint of the racetrack 104. In other words, each segment of each path of travel is compared at a plurality of geolocations along racetrack 104, which are associated with determination points 604, to determine which combination of the stored paths of travel would result in a reduction of the time required to traverse that segment of racetrack 104 and/or the total lap time resulting from all segments of the racetrack 104. A plurality of performance improvement events 606 identified by the processing element 304 at determination points 604 are shown with directional arrows in FIGS. 6B and 6C indicative of the performance improvements that may be communicated to the driver for use with improving the driver's performance for purposes of illustration. Thus, processing element 304 may account for adjacent (segments in front of and behind a current segment along the racetrack 104) and other segments of racetrack 104.

It should also be appreciated that when three or more paths of travel, are evaluated by the processing element 304, each path of travel is compared with each of the other paths of travel. Thus, as illustrated, one of the plurality of determination points 604 may include a performance improvement event 606 from the path of travel from Lap 3 to the path of travel from Lap 1.

As shown in FIG. 6C, the processing element 304 may identify a set of performance improvement points 608, which are associated with determination points 604, that may be utilized to form an optimal path of travel 610. The performance improvement points 608 may be associated with two or more of the paths of travel. The optimal path of travel 610 is determined by following possible routes through the paths of travel and the performance improvement events 606. Numerous factors are considered in determining performance improvement events, 606 including but not limited to, lateral position, speed, acceleration (or deceleration), heading, and altitude, at each respective geolocation. For each factor, such as lateral position, speed, acceleration (or deceleration), heading, altitude, the processing element 304 may utilize a positive, a negative or an absolute threshold.

Unlike conventional routing algorithms for road and other navigational uses, the techniques disclosed herein utilize paths of travel for segments of a single roadway (racetrack 104) that have been driven by the racer or another user. In embodiments, processing element 304 determines the optimal path of travel 610 based on a plurality of complete optimal paths of travel 610 and selecting one optimal path of travel 610 that results in the shortest duration over which a lap of the racetrack 104 may be completed (based on the paths of travel taken by the user). In order to identify and select the fastest path of travel amongst the possible permutations, the processing element 304 may sort the permutations topologically. Topological sorting allows for in-degree and out-degree values for the respective nodes. Topological sorting also allows for interchanging between the respective paths of travel. Tables (e.g., arrays and/or lists) may be generated for the nodes and edges. As an example, edges may be stored in an edge table which contains a start and end as well as a weight. Nodes may be stored in a forward star table and/or a reverse star table. A trace table may contain pointers to the edge table as accessed from the forward and/or revers star table. These tables create an efficient method of determining incoming and outgoing edges from a node, without requiring redundant data storage. For edges leaving a node, the processing element 304 may move from the forward star table to the edge table. For edges coming into a node, the processing element 304 may move from the reverse star table to the trace table and then to the edge table. The processing element 304 may determine the fastest path of travel from each node to other nodes that the node is connected to and select the fastest path of travel.

In embodiments, the processing element 304 may identify determination points 604 at geolocations 110 along racetrack 104 associated with similar vehicle parameters (e.g., lateral position, acceleration (or deceleration), heading, speed, altitude etc.). The processing element 304 may then identify sub-sets of the respective paths before and after the determination point 604. As an example, a first-subset of the first path of travel is before the determination point 604 and a second-subset of the first path of travel is after the determination point 604. To continue the example, a first-subset of the second path of travel is before the determination point 604 and a second-subset of the second path of travel is after the determination point 604. The optimized path of travel 610 includes, for example, the first-subset of the first path of travel and the second-subset of the second path of travel. Thus, the optimal path of travel 610 is determined for the specific driver, utilizing the sub-sets of the paths of travel actually traveled by the driver, not a hypothetical optimal path for any driver. The driver-specific optimal path of travel 610 will account for driving style and skill level for the specific driver. Thus, the driver may be provided with meaningful and applicable advice to improve their performance, instead of generic and inapplicable recommendations. Thus, the optimal path of travel 610 is continuously calculated by the processing element 304 and will improve (result in lower lap times) as the driver improves his performance.

In the example of FIGS. 6B and 6C, the optimal path of travel 610 is determined for a lap beginning and ending at start/finish line 602. Specifically, the driver's performance along initial segments of the third path of travel on Lap 3 is determined by processing element 304 to be optimal through the first two determination points 604. At the third determination point 604, it is determined by processing element 304 that the driver's performance along the associated segment of the first path of travel on Lap 1 is determined to be optimal and preferred over the driver's performance along the corresponding segment third path of travel on Lap 3. Thus, the optimal path of travel 610 incorporates the first path of travel on Lap 1 for segments after the driver's performance for the initial segments along the third path of travel on Lap 3 after the third determination point 604 based at least in part on the performance improvement event 606. At the fourth determination point 604, the processing element 304 determines that the driver's performance at the associated segment along the second path of travel on Lap 2 is preferred over the performance along the corresponding segment of the first path of travel on Lap 1. Thus, the optimal path of travel 610 incorporates the performance along Lap 2 for segments into the performance along Lap 1 after the determination point 604. At the fifth and sixth determination points 604, the processing element 304 determines that continuing with segments of the second path of travel along Lap 2 is preferred over corresponding performance for the segments on Lap 1 or Lap 3, even though the performance improvement event 606 may influence incorporation of the path of travel for this segment from Lap 3. This is in part due to the processing element 304 considering multiple factors in determining which segments of each path of travel to incorporate into the optimal path of travel 610. At the seventh determination point 604, the optimal path of travel 610 incorporates the segment of the first path of travel from Lap 1. It should be appreciated that this exemplary optimal path of travel 610 determination depicted in FIG. 6C is intended to clarify concepts performed by the processing element 304 in determining the optimal path of travel 610. Other instances will utilize more or fewer paths of travel, more or fewer determination points 604, and more or fewer performance improvement events 606. Ultimately, the optimal path of travel 610 is shorter in duration (faster) than Laps 1 to 3.

The processing element 304 may refine the determined optimal path of travel 610 as additional laps of the racetrack 104 are completed. This refining process may include adjusting the time values from the mixed data of the multiple paths of travel. Time data may be consolidated from the multiple paths of travel to determine an optimal path of travel 610 time that the driver could accomplish if traveling along the optimal path of travel 610 at optimal speeds. The optimal path of travel 610 may also be refined to smooth sharp changes in direction that may otherwise be recommended by the processing element 304. For example, if upon the first path of travel the driver had a first heading and upon the second path of travel the driver had a second heading, when the optimal path of travel 610 recommends an interchange between the first path of travel and the second path of travel, the optimal path of travel 610 may blend or gradually change the recommended heading between the first heading and the second heading. This smoothening is beneficial because the driver cannot instantly change headings at the determination points 604. Thus, the processing element 304 may determine and recommend an optimal path of travel 610 containing gradual changes in heading such that the optimal path of travel 610 may be performed by the driver on racetrack 104.

In some embodiments, an average lap time may be determined in addition to the driver-specific optimal path of travel 610. An average lap time is an averaging together of the laps completed by the driver during a session (or during all sessions of the combination of driver, automobile 102, and racetrack 104). The average lap time may be calculated by taking a mean and/or median of the various lap data gathered. An average lap time may give a readily comparable example to contrast with the optimal path of travel 610. Instead of the driver comparing each of numerous previous laps against the optimal path of travel 610, the driver may compare the average lap against the optimal path of travel 610. The average lap time may also be utilized to compare a certain lap to the average lap time, such as to emphasize improvements that were made on a new lap in comparison to the older average lap time.

In Step 408, the processing element 304 analyzes performance of the automobile 102 in real time to assist the driver in performing closer to the above-determined optimal path of travel 610. As shown in FIG. 7, a turn analyzer may be utilized in real time to identify turns and straight portions of racetrack 104. The turn analyzer may analyze the turn segments. In some embodiments, the turn analyzer may be a segment finite state machine. The turn analyzer performs this function while the automobile 102 is being driven on the racetrack 104. The processing element 304 may or may not have information about the layout of racetrack 104 (e.g., locations and shapes of the various corners), thus the turn analyzer is determining when the automobile 102 is turning and when the automobile 102 is traveling straight, based upon a determined heading and other criteria.

The turn analyzer has four possible states: a possible turn, verifying turn, in-turn, and not-in-turn. Because the processing element 304 will know the geographic location of the midpoint of the turn, the turn analyzer can determine whether the driver performed an early apex, a late apex, or a correct apex (being within a certain threshold distance of the midpoint) in real time and provide that feedback to the driver (such as via the audio recommendations). The turn analyzer may also identify braking points and acceleration points. In some embodiments, these points are identified by monitoring acceleration via the location determining component 308 and/or the motion sensors 320. The processing element 304 and/or the location determining component 308 will determine when acceleration and/or deceleration are above a certain threshold. The acceleration points and deceleration points may then be compared to the above-discussed determined maximum heading rate of change. In many instances, the automobile 102 will decelerate (apply brakes) before a turn and accelerate out of a turn. The turn analyzer may thus determine when these activities happened relative to the determined turn.

In Step 410, the processing element 304 controls display 302 and headset/speaker 314 to present or provide audible feedback to utilize the optimal path of travel 610. An audio coach provides recommendations and feedback to the driver before and/or after the specific maneuver. Audible recommendations provided before the turn may be known as advance recommendations. Advance recommendations provided as the driver approaches a maneuver may instruct the driver when to perform various maneuvers (such as braking, turning, and accelerating). Examples of advance recommendations may be "apply the brake now" and "turn-in point in 3, 2, 1, now." Other examples may include "use more track," "brake harder," "accelerate more," and "carry more speed" in relation to the optimal, previous or average lap. Audible recommendations after the maneuver may be known as feedback recommendations. Feedback recommendations may be positive or negative. For instance, feedback recommendations may instruct the driver how to better perform the same turn in future laps. A positive feedback recommendation reinforces maneuvers that the driver performed well. Examples of positive feedback recommendations may include "nice use of track," "nice braking," "nice acceleration," and "nice job carrying speed." Negative feedback recommendations emphasize maneuvers that the driver performed poorly.

The audible recommendations may be based upon a comparison of the current lap to a prior lap, such as the above-discussed optimal path of travel 610, the above-discussed average lap, and/or the above-discussed apex point. For example, a negative feedback recommendation may be provided if the driver performed worse than their average lap. Positive feedback recommendations may be provided if the driver performed near their optimal path of travel 610 or a prior optimal path of travel 610 (and thereby creating a new optimal path of travel 610). Advance recommendations may be provided where the average lap differs significantly from the optimal path of travel 610. In embodiments, the processing element 304 may identify segments at which the driver's average time is most divergent from (losing the most time compared to) the optimal lap of travel 610 and provide recommendations associated with the identified segments.

The audible coach tracks the results of the turn analysis discussed above and determines what recommendations (e.g., what phrases to speak) to make and when to make them. The audible coach may prioritize certain recommendations so as to not overload the driver with too much information, allowing the driver to focus when a lower priority recommendation could be made. The prioritization may be based upon the difference between an average lap and the optimal path of travel 610. Some recommendations may be blocked or delayed if the recommendation would overlap with another recommendation of a higher priority. The time required to deliver the recommendations may be considered in determining which recommendations to deliver and when to deliver such recommendations. For example, a recommendation to be given may be delivered immediately or upon some scheduled time or event in the future (such as upon arriving at a calculated turn-in point for a certain turn).

The prioritization may be based upon the type of recommendations to be given. The driver may select what type of recommendations the driver would like to receive during the race. In these instances, that type of recommendation may be given the highest priority. In some instances, the advance recommendations may be prioritized higher than positive feedback recommendations, which may also be higher than negative feedback recommendations. Thus, a standard priority chain may be user-requested, then advance recommendations, then positive feedback, then negative feedback. This example prioritization list emphasizes steps to increase and praise performance more than criticizing past performance. In this way, the driver is encouraged to build upon past successes rather than criticized over past failures. It should be appreciated that other prioritization schemes may also be utilized.

The audible coach may include a text-to-speech algorithm for turning the textual recommendation into an audible recommendation that will be played by the racing coach device 100. For example, the audible recommendation may be played by the internal speaker 314 of the racing coach device 100, by an audio system of the automobile 102, by a headset worn by the driver, by a stand-alone speaker, or by another device. The processing element 304 is further configured to control the speaker 314 to output the instructions enabling a driver to traverse the racetrack 104 through the optimal path of travel based on the determined current location.

In Step 412, the processing element 304 splices video data to create an optimal path video comprising video data of a first-subset of a first path of travel and a second-subset of a second path of travel. In Step 414, the processing element 304 may display the spliced video of the optimal path of travel 610 to the driver such that the driver can visualize traveling through the optimal path of travel 610.

The camera 312 (and the external camera 326) is configured to collect images of the road forming the racetrack 104 in a field of view 112 and the memory device 306 is configured to store a plurality of images received from the camera 312. The processing element 304 is communicatively coupled with the camera 312 and the memory device 306. The camera 312 may be oriented to capture footage of a field of view proximate to the automobile 102 from the automobile 102. The processing element 304 may analyze the images received from the camera 312 and apply image processing (object recognition) techniques to determine a current lateral position of the automobile 102 along the racetrack 104. For example, the processing element 304 may determine a lateral automobile 102 position within a width of the racetrack 104. The processing element 304 may store the determined lateral position of the automobile 102 in memory device 306, which may also store motion data received from the motion sensor and geographic location information received from the location determining component 308. The processing element 304 may utilize the stored information to determine a complete path along the racetrack 104 (i.e., driving line or racing line) along which the driver drove the automobile 102.

The processing element 304 may utilize the determined path and the plurality of images received from the camera 312 (or external camera 326) to identify an entry 200, an apex 202, and an exit 204 of each turn along the racetrack 104. Subsequently, the processing element 304 may determine whether the automobile 102 traveled through a turn along the ideal path and at ideal speeds (e.g., entry speed, apex speed, exit speed, etc.) to identify aspects of the driver's performance that may be improved. In embodiments, the processing element 304 may utilize the geographic location information received from the location determining component 308 as well as the motion data received from the motion sensor (e.g., deceleration associated with automobile 102 braking, acceleration associated with automobile 102 acceleration, lateral movement associated with automobile 102 turning, etc.) to determine whether the automobile 102 traveled through a turn along the ideal path and at ideal speeds to identify aspects of the driver's performance that may be improved. For example, the processing element 304 may utilize the motion data to determine whether at which geographic location along the racetrack 104 the automobile 102 accelerated relative to the apex (e.g., early turn exit acceleration, late turn exit acceleration, etc.).

Graphical User Interfaces

Various exemplary user interfaces are shown in FIGS. 8A-C, 9A-B, 10A-B, and 11A-D. It is to be understood that any information presented may be on the display 302 of the racing coach device 100, on a display of another computer system, on a heads-up display in the automobile 102, on a head-mounted display worn by the driver, on a mobile device (e.g., tablet or smart phone), or on another display. It is also to be understood that some information may be shown on the racing coach device 100 while other information is shown on another device.

In some embodiments of the invention, the user interface generally allows the user to utilize inputs and outputs to interact with the racing coach device 100. Inputs may include buttons, pushbuttons, knobs, jog dials, shuttle dials, directional pads, multidirectional buttons, switches, keypads, keyboards, mice, joysticks, microphones, touchscreens, or the like, or combinations thereof. Outputs may include lights, dials, meters, or the like, or combinations thereof. With the user interface, the user may be able to control the features and operation of the display 302. Additional user feedback and output may be provided via the speaker 314 or other audible devices. In other embodiments, the user interface does not allow the user to utilize inputs and outputs at certain times, such as during a race.

As shown in FIG. 8A, an introductory display may be shown to the driver. The introductory display allows the driver to select a driver profile and a vehicle profile. As discussed above, embodiments of the invention determine and instruct the driver towards a driver-specific optimal path of travel 610. Thus, the driver profile and the vehicle profile allow the system to differentiate the driver from other drivers. This can account for the driving style and skill level of the specific driver. This can also account for the vehicle specific characteristics, such as the acceleration and handling capabilities of the specific type of vehicle. The driver profile may be previously existing or may be set up by the driver before the race begins. The driver may input various information about themselves to set up the driver profile. The driver profile may include a nickname (as an example, "FLASH" shown in FIG. 8A) and a profile picture. The vehicle profile may be previously existing or may be set up by the driver before the race begins. The vehicle profile may include specific information about the automobile 102, such as a make, model and year (as an example, "FORD GT40 1966" shown in FIG. 8A). The driver may also input other information about the automobile 102, such as the weight and the tires. The vehicle profile may also include a profile picture, which may be generic, default for that type of vehicle, or a photograph input by the user. When the user has selected and/or created the respective driver profile and vehicle profile, the driver will select "DONE" to move on.

As shown in FIG. 8B, a main menu display may be shown to the driver. The main menu display allows two primary functions. First, the user can select to begin a session on the racetrack 104, which may include one or more laps. Upon this selection, the driver may be directed to a session introduction display, as in FIG. 8C discussed below. Second, the user can select to review one or more previous sessions. Upon this selection, the driver may be directed to a session review display, as in FIG. 11A discussed below. Also shown on the main menu display may be location information from the location determining component 308, weather information from the communication element 310. The user may also be able to select various nearby racetracks 104 for an upcoming session.

As shown in FIG. 8C, upon the user selecting to drive a new session, a session introduction display may be shown to the driver. The session introduction display may include information related to the current racetrack 104 (such as the closest racetrack 104 as indicated by the location determining component 308, or the one selected by the driver in the main menu display). If available, other information related to the current driver profile, the current vehicle profile, and the current racetrack 104 profile may be displayed. For example, as shown in FIG. 8C, this information can include a best lap time for this combination of driver, automobile 102, and racetrack 104. As another example, as shown in FIG. 8C, this information can be a top speed for this combination of driver, automobile 102, and racetrack 104.

On the session introduction display, as shown in FIG. 8C, the user is presented with an option to have a race coach on. This option may be only presented if previous information for the combination of driver, automobile 102, and racetrack 104 is available (upon which a driver-specific optimal path of travel 610 may be calculated). In other embodiments, the user may select to have the racing coach on despite no previous combination recordings, such that racing coach instructions will be provided upon an optimal path of travel 610 being calculated based upon two or more laps being completed by the driver. The race coach will instruct the driver (audibly and/or visually) how to accomplish the driver-specific optimal path of travel 610, as discussed above. The user may also be presented with options regarding the race coach. For example, the user may select race coach instructions for only a certain portion of the racetrack 104 (such as a specific corner 106 on which the driver is trying to improve). As another example, the user may select to have only a certain type of race coach instructions provided (such as turn-in points, braking points, or other instructions). As still another example, the user may select to have non-race coach instructions provided (such as lap times and/or other objective information). As yet another example, the user may select to have no instructions or information provided during the race.

As shown in FIG. 9A and 9B, if the user selects to check alignment on the session introduction display, the driver will be invited to align the video camera 312 relative to the automobile 102. A current view of the video camera 312 is shown on the display 302, such that the driver can check the alignment. The video camera 312 is oriented generally forward, as shown in FIG. 1, so as to have a field of view that covers the racetrack 104. The video camera 312 is positioned and oriented such that the processing element 304 to determine the position of the automobile 102 relative to the edges of the racetrack 104. In some embodiments, the video camera 312 may be independently movable relative to the housing 300 of the racing coach device 100. In other embodiments, the video camera 312 is positioned and oriented by positioning and orienting the racing coach device 100 itself. In still other embodiments, the video camera 312 may be independently mounted to the automobile 102 independent of the racing coach device 100. For example, the video camera 312 may be an integrated component of the automobile 102, which sends video to the racing coach device 100 for the above-discussed steps. In FIG. 9A, the user levels the video camera 312 by pivoting or tilting the racing coach device 100 (or independent video camera 312) such that a displayed artificial horizon agrees with a level indication from an internal level sensor in the racing coach device 100 (or independent video camera 312). In FIG. 9B, the driver centers the field of view of the camera 312 with the center of a hood of the automobile 102 (or other reference point) and ensures that a clear view of the racetrack 104 is visible to the video camera 312. The driver may adjust the orientation and/or position of the video camera 312 to ensure the clear view of the racetrack 104. Alignment also aids in the splicing together of multiple video feeds to complete the spliced video of the optimal path of travel 610, as discussed above.

As shown in FIG. 10A, when the driver selects to begin the race, the display 302 will show a pre-race display. The pre-race display is indicative that the racing coach device 100 is ready to begin upon the driver crossing a starting line of the racetrack 104. The starting line may be known to the racing coach device 100 based upon the racetrack 104 information previously loaded and/or selected by the driver. Thus, the racing coach device 100 may begin tracking information about the race, such as the above-discussed set of prior statuses, automatically upon the driver crossing a starting line of the racetrack 104.

As shown in FIG. 10B, when the driver crosses the starting line, the mid-race display is shown. The mid-race display may include display characteristics of the current race, for quick reference by the driver. The display characteristics may include, as a first example, a last lap time of the last completed lap. As a second example, the display characteristics may include a best lap time indicative of the best time for completing a lap by the driver (which may be a best lap time for the current race or a best-ever lap time for that combination of driver, automobile 102, and racetrack 104). As a third example, the display information may include a "delta" which is a change (difference) in the lap time from a best lap time or a previous lap to the current lap (including a negative sign for faster and a positive sign for slower). As a fourth example, the display information may include a total time for the race and/or a lap number indication. This display information may be customizable for the driver based upon the information that the driver selects to see (and laid out in a format per the user input).

Figure 11A:
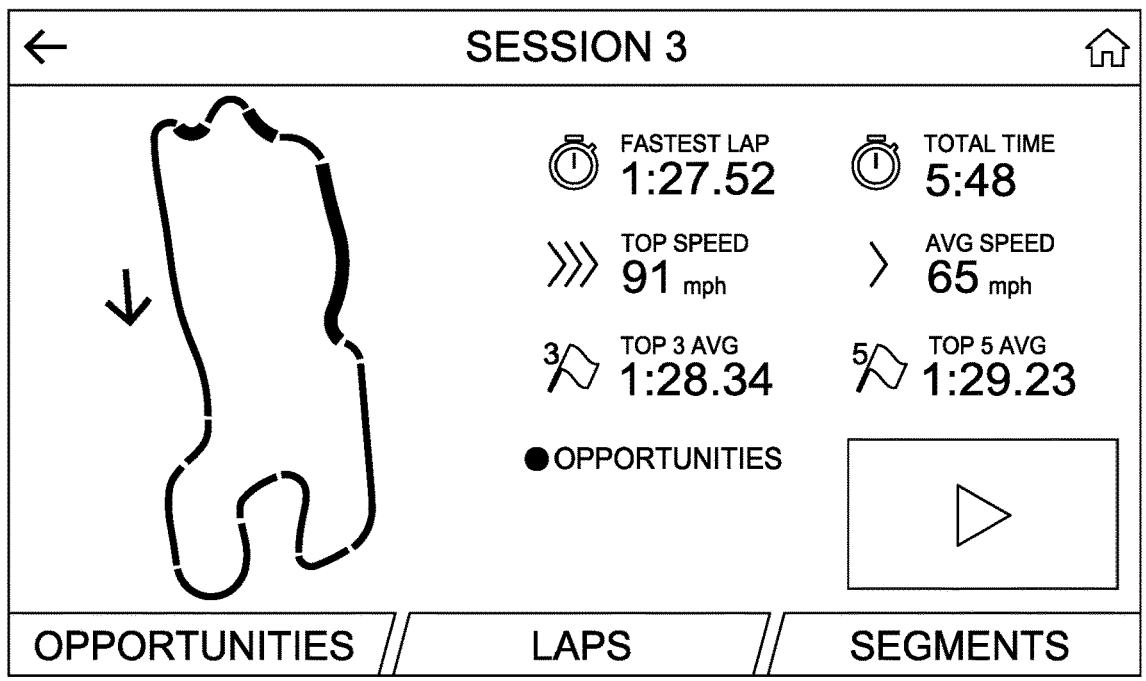

As shown in FIG. 11A, a session review display is shown on the display 302. The session review display includes information about a previous session (such as a race or set of laps completed by the driver). The session review display may include various information about the previous session. Various example information is shown in FIG. 11A. The session review display may include information about a fastest lap (e.g., a lowest lap time from the set of laps of the session), a total time, a top speed, an average speed, a top three average lap time, top five average lap time, and a statistical measure of the driver's consistentcy during this and other sessions. Further, a video of the session may be displayed and/or provided as an option for the user to select. This allows the user to watch all or a portion of the session as part of the review.

The session review display may also include a map of the racetrack 104. The map of the racetrack 104 may be broken into segments based upon the determined corners 106 of the racetrack 104 (or other segments). These segments, as discussed above, may be determined by the processing element or set for the racetrack 104. As shown in FIG. 11A, segments in which the processing element 304 has identified opportunities for improvement may be highlighted or otherwise emphasized on the session review display. The emphasis is displayed to the driver such that the driver may select and review the opportunity for that individual segment and make the recommended changes in subsequent sessions.

Figure 11B:
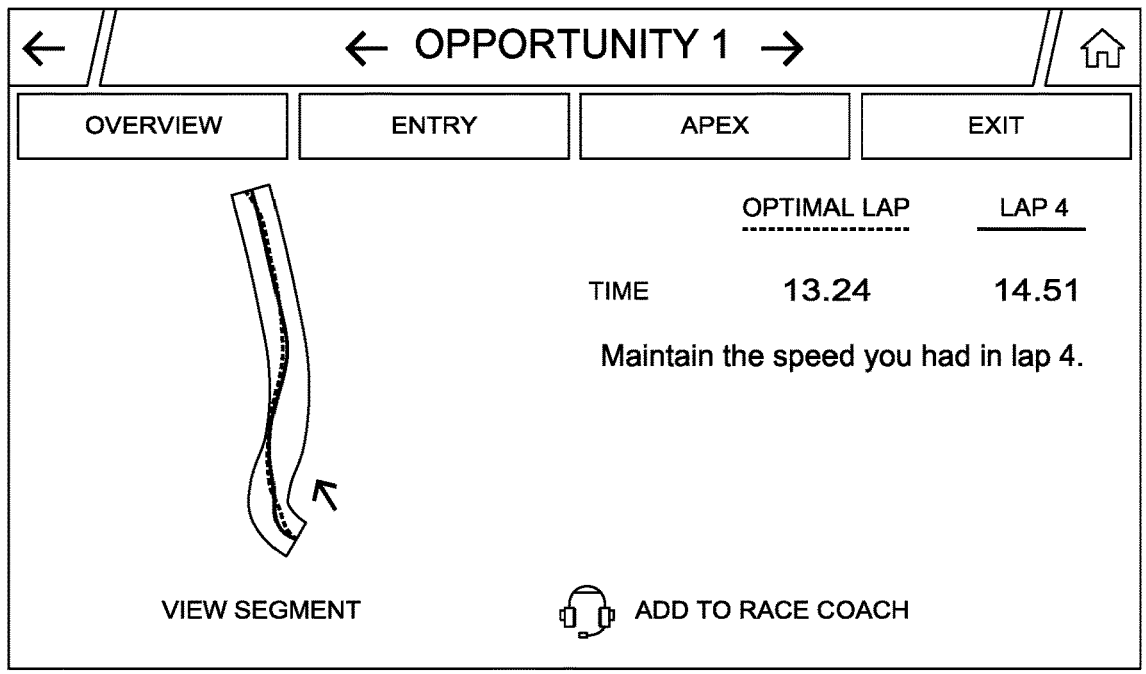

As shown in FIG. 11B, an opportunity display is shown on the display 302. The driver may enter the opportunity display by selecting the "opportunities" button on the session review display. Additionally or alternatively, the driver may select the specific opportunity from the map of the racetrack 104 displayed on the session review display. The opportunity display includes a segment view which includes an indication of the actual performance on that lap along with a depiction of the corresponding segment of the driver-specific optimal path of travel 610 which was calculated (as discussed above) to optimize the driver through that segment. Two simultaneous vehicle indicators may move along the segment to demonstrate to the driver how the optimal path of travel 610 differs from the user-performed lap. An overview of the opportunity may also include other information, such as a traversing time under the optimal path of travel 610 and the user-performed prior lap. Additionally or alternatively, the opportunity display may include a textual summary of the opportunity or other recommendation.

The opportunity display may present to the user an option to add the recommendation to the audible and/or visible coaching recommendations to be delivered to the driver during subsequent iterations of the segment. In other embodiments, the recommendations may be added to the audible and/or visible coaching recommendations automatically by default and the user may be presented with an option to remove them from the audible and/or visible coaching recommendations.

The opportunity display may include an entry page, an apex page, and/or an exit page. The entry page, apex page, and/or exit page provide more specific information regarding those specific aspects of the turn. As discussed above in reference to FIG. 2, the turn-in points 206, 212, and 218 affect the performance of the turn through the apexes 208, 214, and 220; and affect the performance to the exit 210, 216, and 222. Thus, these specific pages may provide an analysis of and recommendations for the various aspects of the turn to reduce the time taken in traversing the corner 106.

Figures 11C, 11D:
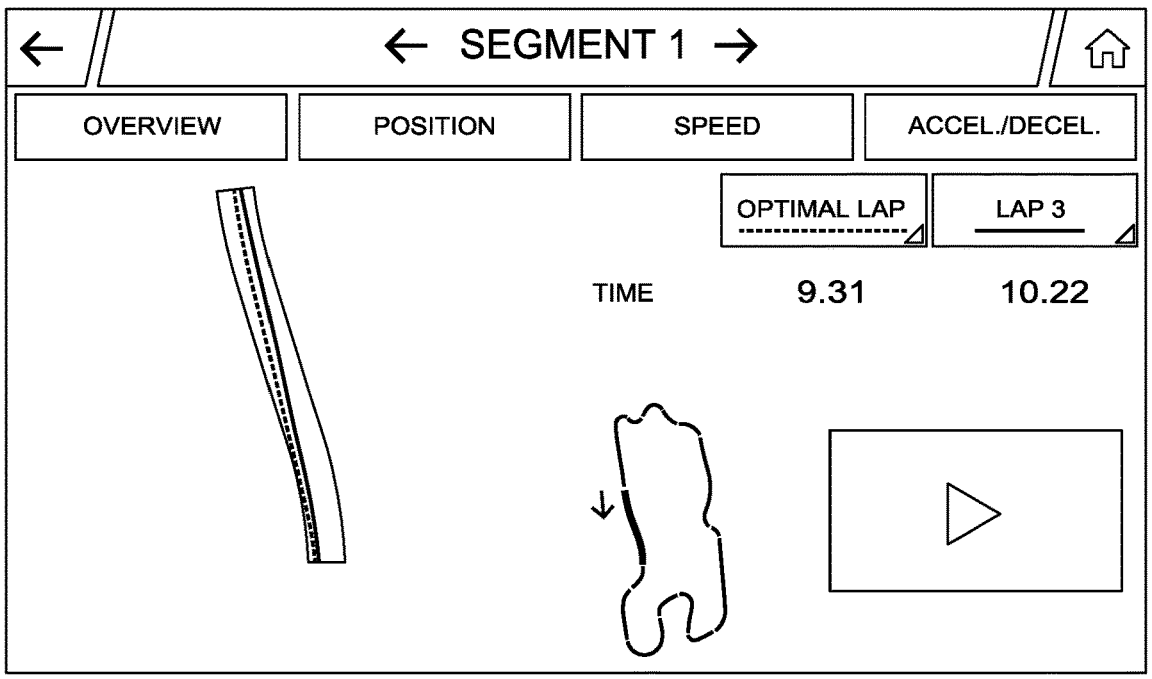

As shown in FIG. 11C, a lap overview display may be shown on the display 302. The lap overview may include time information for the multiple laps that were completed during the session, such that the user may compare these lap and segment times. As shown in FIG. 11D, a segment overview display may be shown on the display 302. The segment overview may include time information for one or more iterations of the segment by the driver, as well as an optimal lap time based upon the calculated optimal lap discussed above. The user may also be presented with a combined video showing the traversing of the optimal path of travel 610, which is created by splicing various clips from the multiple segment videos that were captured by the video camera 312. This allow the user to see what the optimal path of travel 610 would look like if performed by the driver. Thus, the driver can visualize when and how to perform the optimal path of travel 610.

Although the technology has been described with reference to the embodiments illustrated in the attached drawing figures, it is noted that equivalents may be employed, and substitutions made herein without departing from the scope of the technology as recited in the claims.

Having thus described various embodiments of the technology, what is claimed as new and desired to be protected by Letters Patent includes the following:

What is claimed is:

1. A racing coach device comprising:
a memory device configured to store data representative of a first path of travel along a racetrack over a first time period and data representative of a second path of travel along the racetrack over a second time period, each of the first path of travel and the second path of travel formed of a plurality of segments of a predetermined distance along the entire racetrack;
an output device;
a processing element coupled with the memory device and the output device, the processing element configured to:
identify, for each geolocation along the entire racetrack, a duration of time over which a corresponding segment of the first path of travel and a corresponding segment of the second path of travel traversed a respective geolocation,
determine an optimal path of travel by selecting for each geolocation along the entire racetrack one of a corresponding segment of the first path of travel or a corresponding segment of the second path of travel that results in a calculated lap time to traverse the entire racetrack along the determined optimal path of travel based on the identified duration of time associated with each segment of the first path of travel selected in the optimal path of travel and the identified duration of time associated with each segment of the second path of travel selected in the optimal path of travel being less than the first time period and the second time period, the optimal path of travel including one or more determination points at which transitions occur between the selected segments of the first path of travel in the optimal path of travel and the selected segments of the second path of travel in the optimal path of travel, and
control the output device to provide driving performance feedback based on the determined optimal path of travel;
wherein each of the one or more determination points is associated with a similar geolocation between the first path of travel and the second path of travel.

2. The racing coach device of claim 1,
wherein the output device is a display device,
wherein the display device is configured to present a graphical image of the racetrack, and
wherein the display device is configured to present a graphical image of the first path of travel and the optimal path of travel on the graphical image of the racetrack.

3. The racing coach device of claim 1, further comprising a location determining component configured to receive a location signal and determine a current geolocation of the racing coach device using the location signal.

4. The racing coach device of claim 3, wherein the first path of travel along the racetrack corresponds to determined geolocations of the racing coach device over the first time period, and wherein the second path of travel along the racetrack corresponds to determined geolocations of the racing coach device over the second time period.

5. The racing coach device of claim 3,
wherein the output device is a speaker configured to output audible instructions,
wherein the processing element is further configured to control the speaker to output the audible instructions during a subsequent lap of the racetrack after the first time period and the second time period enabling a user to traverse the racetrack through the optimal path of travel on the subsequent lap based on the determined current geolocation.

6. The racing coach device of claim 5, wherein the racing coach device is configured to be utilized within an automobile.

7. The racing coach device of claim 6, wherein the processing element is further configured to:
receive, from the location determining component, a heading of the automobile, and
determine that the automobile is currently turning based at least in part on a rate of change of heading;
wherein the audible instructions are based at least in part on the determined turning of the automobile during the subsequent lap of the racetrack.

8. The racing coach device of claim 1, further comprising:
a motion sensor,
wherein the processing element is further configured to:
determine that an automobile is currently turning based at least in part on a rate of change of heading indicated by the motion sensor, and
wherein the output device provides feedback based on the optimal path and the determined turning of the automobile in real time during a subsequent lap of the racetrack after the first time period and the second time period.

9. The racing coach device of claim 1, wherein the predetermined distance for each segment of the first path of travel and the second path of travel is five feet.

10. The racing coach device of claim 1, wherein the processing element is further configured to blend the start and finish of each segment of the determined optimal path of travel at the one or more determination points to account for differences in a lateral position and a velocity of an automobile at each segment of the first path of travel and the second path of travel.

11. A racing coach device comprising:
a memory device configured to store data representative of a first path of travel along a racetrack over a first time period and data representative of a second path of travel along the racetrack over a second time period, each of the first path of travel and the second path of travel formed of a plurality of segments of a predetermined distance along the entire racetrack;
a location determining component configured to determine a current geolocation of the racing coach device;
a speaker configured to provide an audible instruction to a user;
a processing element coupled with the memory device, the location determining component, and the speaker, the processing element configured to:
identify, for each geolocation along the entire racetrack, a duration of time over which a corresponding segment of the first path of travel and a corresponding segment of the second path of travel traversed a respective geolocation,
determine an optimal path of travel by selecting for each geolocation along the entire racetrack one of a corresponding segment of the first path of travel or a corresponding segment of the second path of travel that results in a calculated lap time to traverse the entire racetrack along the determined optimal path of travel based on the identified duration of time associated with each segment of the first path of travel selected in the optimal path of travel and the identified duration of time associated with each segment of the second path of travel selected in the optimal path of travel being less than the first time period and the second time period, the optimal path of travel including one or more determination points at which transitions occur between the selected segments of the first path of travel in the optimal path of travel and the selected segments of the second path of travel in the optimal path of travel, and
control the speaker to provide the audible instruction to the user based on the determined optimal path of travel during a subsequent lap of the racetrack after the first time period and the second time period;
wherein each of the one or more determination points is associated with a similar geolocation between the first path of travel and the second path of travel.

12. The racing coach device of claim 11, further comprising:
a display device configured to present a graphical image of the racetrack,
wherein the display device is configured to present a graphical image of the first path of travel and the optimal path of travel on the graphical image of the racetrack.

13. The racing coach device of claim 11, wherein the first path of travel along the racetrack corresponds to determined geolocations of the racing coach device over the first time period, and wherein the second path of travel along the racetrack corresponds to determined geolocations of the racing coach device over the second time period.

14. The racing coach device of claim 13, wherein the audible instructions output by the speaker enable the user to traverse the racetrack along the optimal path of travel based on the determined current geolocation.

15. The racing coach device of claim 14, further comprising a motion sensor, wherein the racing coach device is configured to be utilized within an automobile, wherein the processing element is further configured to determine that the automobile is currently turning based at least in part on a rate of change of heading indicated by the motion sensor, and wherein the audible instructions are based on the optimal path of travel and the determined turning of the automobile in real time during the subsequent lap of the racetrack.

16. The racing coach device of claim 11, wherein the predetermined distance for each segment of the first path of travel and the second path of travel is five feet.

17. The racing coach device of claim 11, wherein the processing element is further configured to blend the start and finish of each segment of the determined optimal path of travel at the one or more determination points to account for differences in a lateral position and a velocity of an automobile at each segment of the first path of travel and the second path of travel.

18. A racing coach device comprising:
a memory device configured to store data representative of a first path of travel along a racetrack over a first time period and data representative of a second path of travel along the racetrack over a second time period, each of the first path of travel and the second path of travel formed of a plurality of segments of a predetermined distance along the entire racetrack;
a video camera configured to generate a first video of a field of view as an automobile travels along the first path of travel over the first time period and a second video as the automobile travels along the second path of travel over the second time period;
a processing element coupled with the memory device and the video camera, the processing element configured to:
identify, for each geolocation along the entire racetrack, a duration of time over which a corresponding segment of the first path of travel and a corresponding segment of the second path of travel traversed a respective geolocation, determine an optimal path of travel by selecting for each geolocation along the entire racetrack one of a corresponding segment of the first path of travel or a corresponding segment of the second path of travel that results in a calculated lap time to traverse the entire racetrack along the determined optimal path of travel based on the identified duration of time associated with each segment of the first path of travel selected in the optimal path of travel and the identified duration of time associated with each segment of the second path of travel selected in the optimal path of travel being less than the first time period and the second time period, the optimal path of travel including one or more determination points at which transitions occur between the selected segments of the first path of travel in the optimal path of travel and the selected segments of the second path of travel in the optimal path of travel, and generate a spliced video of the determined optimal path of travel including the first video corresponding to portions of the determined optimal path of travel formed by segments of the first path of travel selected in the optimal path of travel and the second video corresponding to portions of the determined optimal path of travel formed by segments of the second path of travel selected in the optimal path of travel;

wherein each of the one or more determination points is associated with a similar geolocation between the first path of travel and the second path of travel.

19. The racing coach device of claim 18, further comprising a display device, wherein the processing element is further configured to:
   present, on the display device, a graphical image of the racetrack,
   present, on the display device, a graphical image of the first path of travel and the optimal path of travel on the graphical image of the racetrack, and
   present, on the display device, the spliced video of the optimal path of travel.

20. The racing coach device of claim 18, wherein the processing element is further configured to:
   determine a lateral position location of the automobile along the racetrack during the first path of travel by analyzing the first video generated as the automobile traveled along the first path of travel over the first time period, and
   determine a lateral position location of the automobile along the racetrack during the second path of travel by analyzing the second video generated as the automobile traveled along the second path of travel over the second time period.

21. The racing coach device of claim 18, further comprising:
   a location determining component configured to receive a location signal and determine a current geolocation of the racing coach device using the location signal,
   wherein the processing element is further configured to associate the current geolocation with the captured video data.

22. The racing coach device of claim 18, wherein the predetermined distance for each segment of the first path of travel and the second path of travel is five feet.

23. The racing coach device of claim 18, further comprising:
   a motion sensor, and
   an output device;
   wherein the processing element is further configured to determine that the automobile is currently turning based at least in part on a rate of change of heading indicated by the motion sensor, and
   wherein the output device provides driving performance feedback based on the determined optimal path of travel and the determined turning of the automobile in real time during a subsequent lap of the racetrack after the first time period and the second time period.

24. The racing coach device of claim 18, wherein the processing element is further configured to blend the start and finish of each segment of the determined optimal path of travel at one or more determination points to account for differences in a lateral position and a velocity of the automobile at each segment of the first path of travel and the second path of travel.

\* \* \* \* \*